(12) United States Patent
Yoshioka et al.

(10) Patent No.: US 12,237,767 B2
(45) Date of Patent: Feb. 25, 2025

(54) INDUCTOR COMPONENT, DC-DC CONVERTER, AND METHOD FOR MANUFACTURING INDUCTOR COMPONENT

(71) Applicant: Murata Manufacturing Co., Ltd., Kyoto-fu (JP)

(72) Inventors: Yoshimasa Yoshioka, Nagaokakyo (JP); Naoya Noo, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 751 days.

(21) Appl. No.: 17/517,584

(22) Filed: Nov. 2, 2021

(65) Prior Publication Data
US 2022/0140730 A1     May 5, 2022

(30) Foreign Application Priority Data
Nov. 5, 2020 (JP) ................. 2020-184991

(51) Int. Cl.
| | |
|---|---|
| *H01F 5/00* | (2006.01) |
| *H01F 17/00* | (2006.01) |
| *H01F 17/04* | (2006.01) |
| *H01F 27/28* | (2006.01) |
| *H01F 41/02* | (2006.01) |
| *H02M 3/158* | (2006.01) |

(52) U.S. Cl.
CPC ........ *H02M 3/158* (2013.01); *H01F 17/0013* (2013.01); *H01F 17/04* (2013.01); *H01F 27/2823* (2013.01); *H01F 41/0246* (2013.01); *H01F 2017/048* (2013.01)

(58) Field of Classification Search
CPC .................................................. H01F 27/2823

USPC ........................................................ 336/200
See application file for complete search history.

(56) References Cited

U.S. PATENT DOCUMENTS

| | | | | |
|---|---|---|---|---|
| 4,393,157 | A * | 7/1983 | Roberge .................. | H01F 21/08 323/355 |
| 6,515,568 | B1 * | 2/2003 | Maki ......................... | H01F 3/10 336/200 |
| 2005/0253657 | A1 * | 11/2005 | Taylor ..................... | H03F 1/3205 330/296 |
| 2011/0057640 | A1 * | 3/2011 | Cuk ....................... | H02M 3/155 323/311 |
| 2016/0012955 | A1 * | 1/2016 | Kuo ..................... | H01F 27/2847 336/212 |
| 2016/0276093 | A1 * | 9/2016 | Matsubayashi ....... | H01F 27/245 |
| 2018/0076723 | A1 * | 3/2018 | Li ........................ | H02M 3/3378 |
| 2019/0326826 | A1 * | 10/2019 | Otake ............... | H02M 3/33573 |

FOREIGN PATENT DOCUMENTS

JP     2016-051752 A     4/2016

* cited by examiner

*Primary Examiner* — Ronald Hinson
(74) *Attorney, Agent, or Firm* — Studebaker & Brackett PC

(57) ABSTRACT

When an inductor component is adopted as an inductor for a DC-DC converter, high efficiency is achieved at a light load, and a large current is also handled. An inductor component includes a body containing metal magnetic powder containing an iron element, and an inductor provided in the body and having both ends exposed from the body. In a DC superposition characteristic curve of the inductor, a first steady region and a second steady region exist as a steady region, and a transition region exists between the first steady region and the second steady region.

19 Claims, 13 Drawing Sheets

INDUCTOR COMPONENT, DC-DC CONVERTER, AND METHOD FOR MANUFACTURING INDUCTOR COMPONENT

CROSS-REFERENCE TO RELATED APPLICATION

This application claims benefit of priority to Japanese Patent Application No. 2020-184991, filed Nov. 5, 2020, the entire content of which is incorporated herein by reference.

BACKGROUND

Technical Field

The present disclosure relates to an inductor component, a DC-DC converter including the inductor component, and a method for manufacturing the inductor component.

Background Art

Japanese Patent Application Laid-Open No. 2016-51752 discloses an example of an inductor component in which an inductor is provided in a body containing a magnetic material. In this inductor component, a non-magnetic part containing a non-magnetic material such as glass is provided in the body to improve magnetic saturation characteristics.

SUMMARY

In the inductor component, when an alternating current flows through the inductor, inductance is generated. For example, in a power inductor for a DC-DC converter or the like, a direct current supplied from a DC power supply to an inductor component is turned on or off, and thus a rectangular wave is input to the inductor as an alternating current. The rectangular wave input to the inductor flows through the inductor as a triangular wave in which a ripple current is added to a certain amount of DC bias current by inductance generated in the inductor. When the DC bias current increases by a certain amount or more, magnetic saturation occurs in the inductor component, and the inductance extremely decreases. In a general inductor component, the inductance until magnetic saturation occurs is within a certain range, and there is one nominal inductance value.

Here, in the conventional inductor component described above, by providing the non-magnetic part in the body, a value of the magnetically saturated DC bias current is increased to handle a large current. However, in this case, since effective magnetic permeability of the body becomes low, the inductance becomes smaller than inductance of an inductor component in which the non-magnetic part is not provided in the body.

With a light load in which a current flowing through an inductor is small, the DC-DC converter can improve efficiency of voltage conversion by suppressing a ripple current. However, when the inductance is small as in the above conventional inductor component, the ripple current increases, and thus the efficiency of voltage conversion at a light load is not improved. It is therefore difficult to achieve high efficiency at a light load and also handle a large current.

An inductor component according to an aspect of the present disclosure includes a body containing metal magnetic powder containing an iron element, and an inductor provided in the body and having both ends exposed from the body. In a DC superposition characteristic curve represented as a value for a DC bias current superimposed on an alternating current of "100 MHz" flowing through the inductor, a horizontal axis represents a value of the DC bias current, a vertical axis represents a relative value of the inductance when a value of the inductance generated when the value of the DC bias current is "0 A" is set to "1", a region in which a fluctuation on the vertical axis is within "0.1" over an interval of "0.3 A" or more on the horizontal axis is defined as a steady region, and a region in which a fluctuation on the vertical axis exceeds "0.1" in an interval of less than "0.3 A" on the horizontal axis is defined as a transition region. In this case, in the DC superposition characteristic curve of the inductor, a first steady region and a second steady region exist as the steady region, and a transition region exists between the first steady region and the second steady region.

In the DC superposition characteristic curve of the inductor component as configured above, the first steady region, the second steady region, and the transition region interposed between the first steady region and the second steady region exist. This means that magnetic saturation occurs in at least two stages after one of the first steady region or the second steady region (transition region) and after the other steady region. That is, in the DC superposition characteristic curve of the inductor component, the value of the magnetically saturated DC bias current is low but the value of the inductance is high in one of the steady regions, whereas the value of the inductance is low but the value of the magnetically saturated DC bias current is high in the other steady region. In the inductor component having such a DC superposition characteristic curve, for example, when the inductor component is used as a power inductor of the DC-DC converter, generation of ripples can be suppressed by one of the steady regions at a light load, efficiency of voltage conversion can be improved, and a large current can be handled by the other steady region.

A DC-DC converter according to an aspect of the present disclosure includes the inductor component described above. This DC-DC converter can achieve high efficiency at a light load and also handle a large current. A DC-DC converter according to an aspect of the present disclosure includes the above-described inductor component further including, in addition to a first inductor wire as the inductor, a second inductor provided in the body and not electrically connected to the first inductor, an input terminal electrically connected to a DC power supply, a first switching element provided on a wire electrically connecting the input terminal and the first inductor, a second switching element provided on a wire electrically connecting the input terminal and the second inductor, and a controller configured to shift a phase between on and off of the first switching element and on and off of the second switching element by "360°/N (where N is a natural number of 2 or more)".

The above DC-DC converter can realize a multiphase DC-DC converter capable of achieving high efficiency at a light load and also handling a large current. A method for manufacturing an inductor component according to an aspect of the present disclosure is a method for manufacturing an inductor component including a body containing metal magnetic powder containing an iron element, and an inductor provided in the body and having both ends exposed from the body. In a DC superposition characteristic curve represented as a value for a DC bias current superimposed on an alternating current of "100 MHz" flowing through the inductor, a horizontal axis represents a value of the DC bias current, a vertical axis represents a relative value of the inductance when a value of the inductance generated when the value of the DC bias current is "0 A" is set to "1", a region in which a fluctuation on the vertical axis is within "0.1" over an interval of "0.3 A" or more on the horizontal axis is defined as a steady region, and a region in which a fluctuation on the vertical axis exceeds "0.1" in an interval of less than "0.3 A" on the horizontal axis is defined as a transition region. In the method, the body is formed by forming a first magnetic portion containing the metal magnetic powder containing the iron element as a first magnetic material and a second magnetic portion containing a second magnetic material different from the metal magnetic powder. The first magnetic portion and the second magnetic portion are made different from each other in at least one of relative magnetic permeability, a volume, a positional relationship with the inductor, composition of a magnetic material contained in the first magnetic portion and the second magnetic portion, a particle diameter of the magnetic material, or a content of the magnetic material, for the first steady region and the second steady region to exist as the steady region in the DC superposition characteristic curve, and for the transition region to exist between the first steady region and the second steady region.

An inductor component manufactured by the above method can obtain equal function and effect to those of the above inductor component.

DETAILED DESCRIPTION

First Embodiment

Figure 1:
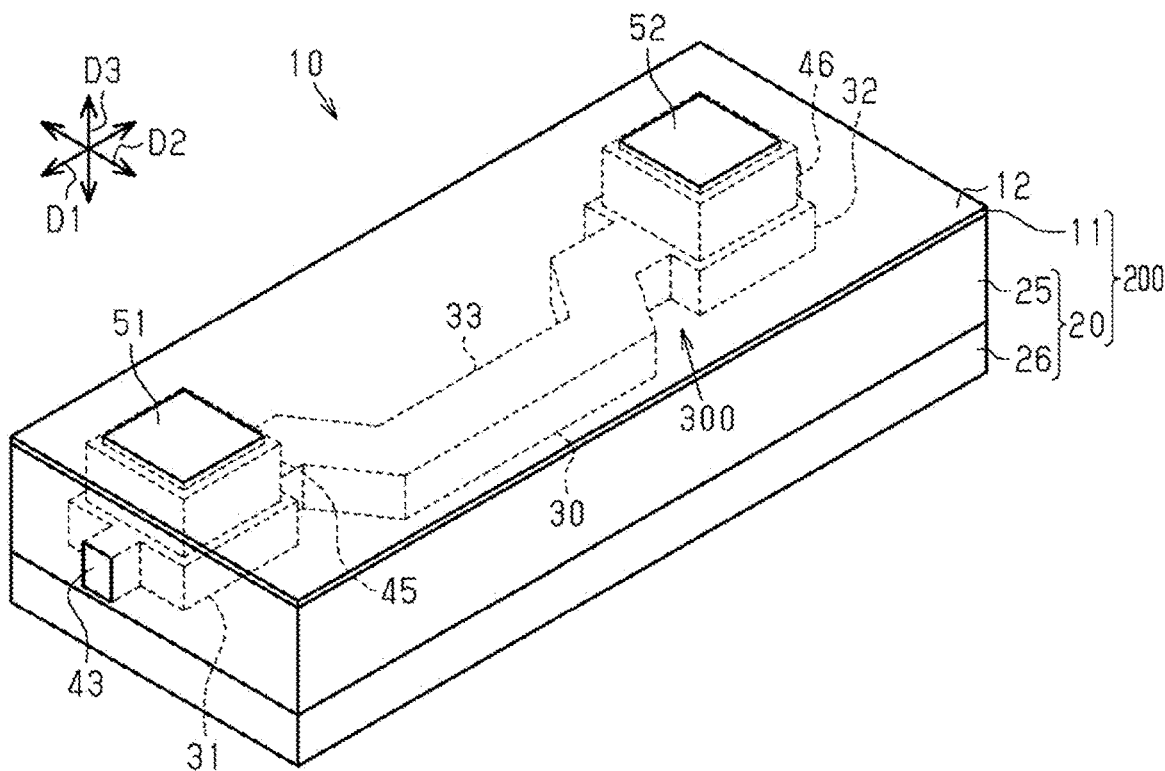
FIG. 1 is a schematic perspective view of an inductor component according to a first embodiment.

Hereinafter, an embodiment of an inductor component, a DC-DC converter, and a method for manufacturing the inductor component will be described with reference to FIGS. 1 to 20. Note that, in the drawings, components may be illustrated in enlarged views to facilitate understanding. Dimensional ratios of the components may be different from actual dimensional ratios or dimensional ratios in another drawing. Although hatching is applied in the sectional views, hatching of some components may be omitted to facilitate understanding.

Figure 2:
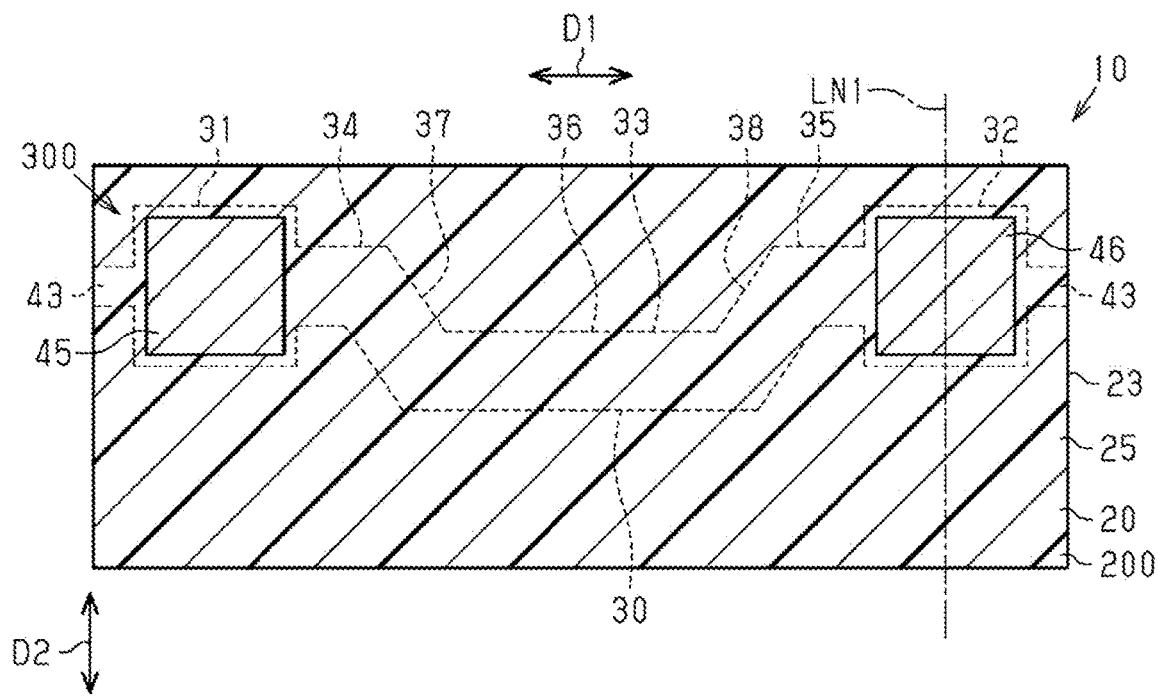
FIG. 2 is a sectional view of the inductor component.

As illustrated in FIGS. 1 and 2, an inductor component 10 according to the present embodiment includes a body 200 and an inductor 300 provided in the body 200. As will be described in detail later, both ends of the inductor 300 are exposed from the body 200.

In this example, as illustrated in FIGS. 1 and 2, the body 200 has a rectangular parallelepiped shape. The shape of the body 200 is not limited to a rectangular parallelepiped shape, and may be, for example, a columnar shape or a polygonal shape. The body 200 includes a surface layer 11. A surface of the surface layer 11, that is, an upper surface in FIG. 3 is a main surface 12 of the inductor component 10.

Of directions along the main surface 12 of the inductor component 10, a left-right direction in FIG. 2 is referred to as a "first direction D1", and an up-down direction in FIG. 2 is referred to as a "second direction D2". That is, the second direction D2 is a direction orthogonal to the first direction D1. Further, the up-down direction in FIG. 3, which is a direction orthogonal to the main surface 12, is referred to as a "third direction D3".

The surface layer 11 is a non-magnetic insulator. In the present embodiment, non-magnetism means that relative magnetic permeability is "1". The insulator has a specific resistance of "1 MΩ·cm" or more. The surface layer 11 contains, for example, a polyimide resin, an acrylic resin, an epoxy resin, a phenol resin, and a liquid crystal polymer. In order to enhance insulation performance of the surface layer 11, the surface layer 11 may contain an insulating filler such as a silica filler.

Figure 3:
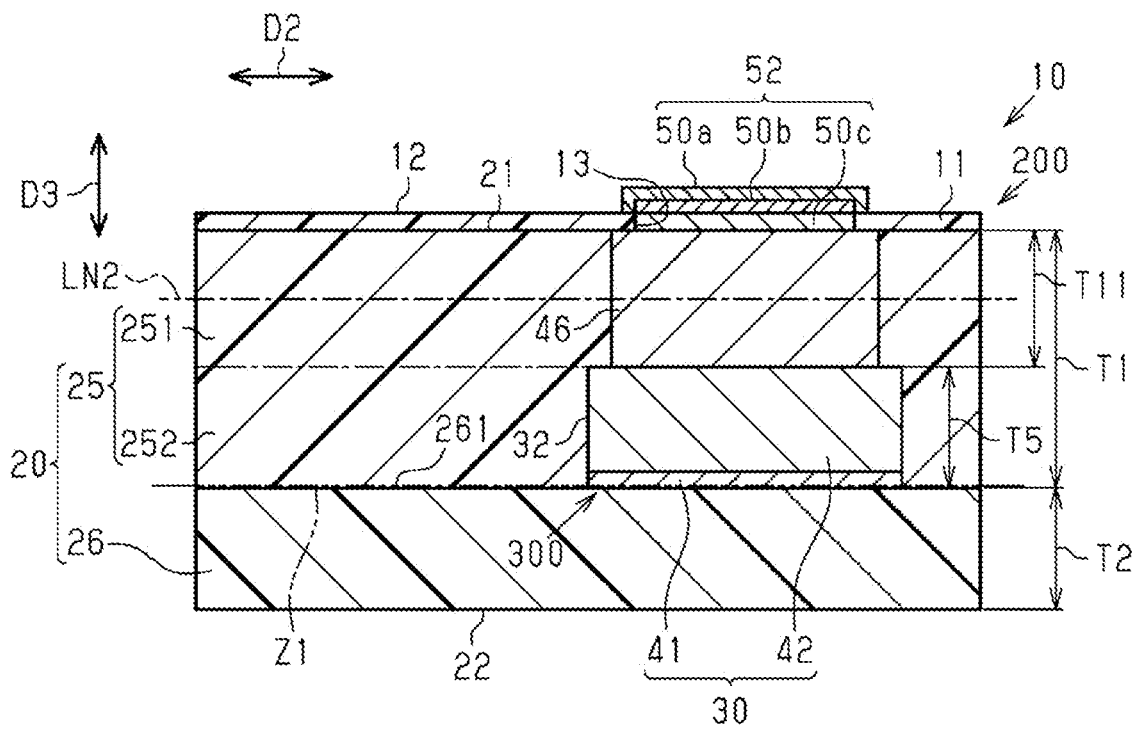
FIG. 3 is a sectional view of the inductor component.

When a part of the body 200 excluding the surface layer 11 is defined as a specified portion 20, an upper surface of side surfaces of the specified portion 20 in FIG. 3 is referred to as a "first specified main surface 21". The first specified main surface 21 is in contact with the surface layer 11. Of the side surfaces of the specified portion 20, a main surface that is a lower surface in FIG. 3 and is located opposite to the first specified main surface 21 across an inductor wire 30 to be described later is referred to as a "second specified main surface 22". Of the side surfaces of the specified portion 20, a part other than the first specified main surface 21 and the second specified main surface 22 is referred to as a "specified non-main surface 23". That is, the side surfaces of the specified portion 20 include the first specified main surface 21, the second specified main surface 22, and the specified non-main surface 23. FIG. 3 is a diagram illustrating a section of the inductor component 10 taken along a line LN1 indicated by an alternate long and short dash line in FIG. 2. The line LN1 is a straight line extending in the second direction D2. That is, the section illustrated in FIG. 3 is a plane orthogonal to the first direction D1. FIG. 2 is a diagram illustrating a section of the inductor component 10 taken along a line LN2 indicated by an alternate long and short dash line in FIG. 3. The line LN2 is a straight line extending in the second direction D2. That is, the section illustrated in FIG. 2 is a plane orthogonal to the third direction D3.

As illustrated in FIGS. 1 and 2, the inductor 300 includes the inductor wire 30. The inductor wire 30 is disposed in the specified portion 20. The inductor wire 30 has a first end 31 in the first direction D1, a second end 32 in the first direction D1, and a wiring body 33 connecting the first end 31 and the second end 32. The wiring body 33 includes a first connection 34 connected to the first end 31, a second connection 35 connected to the second end 32, and a central portion 36 disposed between the first connection 34 and the second connection 35 in the first direction D1. The first connection 34, the second connection 35, and the central portion 36 extend in the first direction D1. The wiring body 33 includes a first link 37 connecting the first connection 34 and the central portion 36, and a second link 38 connecting the second connection 35 and the central portion 36.

As illustrated in FIG. 3, the inductor wire 30 is disposed on a predetermined arrangement plane Z1 located between the first specified main surface 21 and the second specified main surface 22 in the third direction D3. The arrangement plane Z1 may be parallel to the first specified main surface 21 and the second specified main surface 22 as shown in FIG. 3, or may not be parallel to the first specified main surface 21 and the second specified main surface 22.

The inductor wire 30 contains a conductive material. The inductor wire 30 contains, for example, at least one of copper, silver, gold, or aluminum as a conductive material. Further, for example, the inductor wire 30 may contain an alloy containing at least one of copper, silver, gold, or aluminum as a conductive material. As illustrated in FIG. 3, the inductor wire 30 includes a seed layer 41 and a conductive layer 42 disposed on the seed layer 41. The seed layer 41 contains, for example, copper as a conductive material. A dimension of the seed layer 41 in the third direction D3 is smaller than a dimension of the conductive layer 42 in the third direction D3. The seed layer 41 may include at least one layer of a titanium-containing layer or a tungsten-containing layer as a layer.

The conductive layer 42 contains, for example, copper and sulfur. When the conductive layer 42 contains copper and sulfur as described above, the conductive layer 42 preferably has a copper ratio of "99 wt %" or more and a sulfur ratio of "0.1 wt %" or more and less than "1.0 wt %" (i.e., from "0.1 wt %" to "1.0 wt %"). The ratio here is a ratio with respect to a weight of the conductive layer 42 as a whole. Note that the inductor wire 30 may not include the seed layer 41.

As illustrated in FIG. 2, a dummy wire disposed on the predetermined arrangement plane Z1 is connected to the inductor wire 30. Specifically, the dummy wire 43 connected to the first end 31 of the inductor wire 30 and the dummy wire 43 connected to the second end 32 of the inductor wire 30 are provided. Each of the dummy wires 43 extends from a connection with the inductor wire 30 to the specified non-main surface 23 of the specified portion 20. That is, an end surface of each dummy wire 43 is exposed to outside.

The inductor 300 includes a vertical wire connected to the inductor wire 30. In this example, as illustrated in FIGS. 1 and 2, the inductor 300 includes a vertical wire 45 connected to the first end 31 of the inductor wire 30 and a vertical wire 46 connected to the second end 32 of the inductor wire 30. That is, each of the first end 31 and the second end 32 serves as a connection of the inductor wire 30 with the vertical wires 45 and 46. The vertical wires 45 and 46 extend to the first specified main surface 21.

The inductor 300 includes a first external terminal 51 as an external terminal electrically connected to the first end 31 of the inductor wire 30 and a second external terminal 52 as an external terminal electrically connected to the second end 32 of the inductor wire 30. The first external terminal 51 is electrically connected to the first end 31 with the vertical wire 45 interposed therebetween. The second external terminal 52 is electrically connected to the second end 32 with the vertical wire 46 interposed therebetween. The first external terminal 51 and the second external terminal 52 correspond to ends of the inductor 300.

The external terminals 51 and 52 are exposed to outside from the surface layer 11. That is, the surface layer 11 is provided with a through hole 13 that exposes the first specified main surface 21 to outside. The external terminals 51 and 52 are formed so as to fill the through hole 13. The external terminals 51 and 52 are in contact with a peripheral wall of the through hole 13 and the surface of the surface layer 11 (that is, main surface 12) in addition to end surfaces of the vertical wires 45 and 46.

For example, each of the external terminals 51 and 52 is a laminated body obtained by laminating a plurality of layers. In the example illustrated in FIG. 3, the external terminals 51 and 52 are laminated bodies including three layers 50a, 50b, and 50c. The laminated bodies contain, for example, at least one metal of copper, nickel, gold, or tin. For example, the laminated bodies may contain an alloy composed of at least two of copper, nickel, gold, or tin.

For example, among the plurality of layers 50a, 50b, and 50c, the layer 50a as an outermost layer is a solderable layer that improves solder wettability. The solderable layer preferably contains gold, tin, or the like. The solderable layer may contain at least one of an alloy containing gold or an alloy containing tin.

The layer 50a as the outermost layer may be a layer that suppresses oxidation of the external terminals 51 and 52. Further, for example, the layer 50b located between the layer 50a and the layer 50c may be a corrosion inhibition layer. The corrosion inhibition layer preferably contains, for example, nickel. The corrosion inhibition layer may contain an alloy containing nickel.

For example, the layer 50c is a layer that improves conductivity. Such a layer preferably contains copper or the like. The layer may contain an alloy containing copper. The specified portion 20 is a laminated body in which a plurality of magnetic layers are laminated along the third direction D3. The body 200 includes the surface layer 11 in addition to the specified portion 20. Therefore, it can be said that the body 200 has a part in which a plurality of layers are laminated. That is, in this example, the third direction D3 is a laminating direction of the plurality of layers constituting the body 200.

In this example, as shown in FIG. 3, the specified portion 20 includes a first magnetic layer 25 and a second magnetic layer 26 laminated along the third direction D3. The first magnetic layer 25 and the second magnetic layer 26 are laminated such that the first magnetic layer 25 is disposed between the surface layer 11 and the second magnetic layer 26 in the third direction D3.

In this example, as illustrated in FIG. 3, the inductor wire 30 and the vertical wires 45 and 46 are provided in the first magnetic layer 25. However, a lower surface of the inductor wire 30 in the drawing is in contact with the second magnetic layer 26. That is, it can be said that the arrangement plane Z1 includes a boundary between the first magnetic layer 25 and the second magnetic layer 26. Then, of both main surfaces of the second magnetic layer 26, the inductor wire 30 extends along the main surface 261 in contact with the first magnetic layer 25. Further, in the third direction D3, the inductor wire 30 is sandwiched between the first magnetic layer 25 and the second magnetic layer 26.

When a dimension of the first magnetic layer 25 in the third direction D3 is a "thickness T1 of the first magnetic layer 25" and a dimension of the second magnetic layer 26 in the third direction D3 is a "thickness T2 of the second magnetic layer 26", in this example, the thickness T1 of the first magnetic layer 25 is larger than the thickness T2 of the second magnetic layer 26 as illustrated in FIG. 3. For example, the thickness T2 of the second magnetic layer 26 is "45 μm" or more and "55 μm" or less (i.e. from "45 μm" to "55 μm"). When a part of the second magnetic layer 26 where a distance from the boundary between the second magnetic layer 26 and the first magnetic layer 25 to the second specified main surface 22 is maximized is defined as a "maximum portion", a dimension of the maximum portion in the third direction D3 is preferably set as the thickness T2 of the second magnetic layer 26. For example, in a section of the body 200 orthogonal to the first direction D1 including a center of the body 200 in the first direction D1, a part where the distance from the boundary between the second magnetic layer 26 and the first magnetic layer 25 to the second specified main surface 22 is maximized is defined as a "maximum portion".

A part of the first magnetic layer 25 close to the surface layer 11 (upper side in the drawing) in the third direction D3 is defined as a magnetic portion 251 on surface layer side, and a part of the first magnetic layer 25 close to the second magnetic layer 26 (lower side in the drawing) in the third direction D3 is defined as a magnetic portion 252 on counter surface layer side. In this case, the magnetic portion 251 on surface layer side is in contact with the surface layer 11 but not in contact with the second magnetic layer 26. On the other hand, the magnetic portion 252 on counter surface layer side is in contact with the second magnetic layer 26 but is not in contact with the surface layer 11.

A surface of the inductor wire 30 including a portion closest to the surface layer 11 in the third direction D3 and parallel to the first specified main surface 21 is defined as a "boundary main surface". In this example, as illustrated in FIG. 3, a part of the first magnetic layer 25 between the boundary main surface and the first specified main surface 21 in the third direction D3 corresponds to the magnetic portion 251 on surface layer side. A part of the first magnetic layer 25 other than the magnetic portion 251 on surface layer side corresponds to the magnetic portion 252 on counter surface layer side. Thus, the inductor wire 30 is not provided in the magnetic portion 251 on surface layer side, whereas the inductor wire 30 is provided in the magnetic portion 252 on counter surface layer side. When a dimension of the magnetic portion 251 on surface layer side in the third direction D3 is a thickness T11 of the magnetic portion 251 on surface layer side, the thickness T11 is substantially equal to the thickness T2 of the second magnetic layer 26. That is,
the thickness T11 of the magnetic portion 251 on surface layer side is "45 μm" or more and "55 μm" or less (i.e., from "45 μm" to "55 μm"). When a dimension of the inductor wire 30 in the third direction D3 is a thickness T5 of the inductor wire 30, the thickness of the magnetic portion 251 on surface layer side can be regarded as being equal to the thickness T5 of the inductor wire 30. Therefore, the thickness T1 of the first magnetic layer 25 increases as the thickness T5 of the inductor wire 30 increases.

The first magnetic layer 25 includes a resin containing a metal magnetic powder containing an iron element. That is, the first magnetic layer 25 contains, as the metal magnetic powder containing an iron element, at least one of iron metal magnetic powder or iron-containing alloy metal magnetic powder. Examples of the alloy containing iron include an alloy containing iron, silicon, and chromium, an alloy containing iron and nickel, and an alloy containing iron, silicon, and aluminum. The iron-containing alloy may be an iron-cobalt-based alloy. In the following description, the metal magnetic powder containing an iron element is also referred to as an "iron-based metal magnetic powder".

A filling rate of the iron-based metal magnetic powder in the first magnetic layer 25 is "50 wt %" or more and "90 wt %" or less (i.e., from "50 wt %" to "90 wt %"). The filling rate here is a value obtained by setting a total weight of the first magnetic layer 25 as a denominator and setting a total weight of the iron-based metal magnetic powder as a numerator. An average particle diameter of the iron-based metal magnetic powder contained in the first magnetic layer 25 is "1 μm" or more and "10 μm" or less (i.e., from "1 μm" to "10 μm"). The average particle diameter referred to herein is, for example, a median diameter "D50".

As a method for measuring the average particle diameter, for example, the following method can be adopted. In a section of the first magnetic layer 25 as shown in FIG. 3, images of the section of the first magnetic layer 25 containing 30 or more iron-based metal magnetic powder particles are acquired at three different positions. The images of the section are acquired by scanning electron microscope (SEM) with a magnification adjusted to an appropriate size (for example, 1,000 power). Then, from these images, a particle diameter of the iron-based metal magnetic powder is calculated as a converted value from an area. Among the particle diameters, a value (cumulative 50% value) located at a center when the particles are arranged in ascending order is taken as the average particle diameter.

Examples of the resin containing the iron-based metal magnetic powder include a resin material such as an epoxy resin. In consideration of insulation properties and moldability, it is preferable to employ a polyimide resin, an acrylic resin, or a phenol resin as the resin.

The second magnetic layer 26 does not contain iron-based metal magnetic powder. That is, the second magnetic layer 26 contains a magnetic material different from the iron-based metal magnetic powder. Metal magnetic powders can be different magnetic materials by changing at least one of components, a composition ratio, a particle diameter, or content.

Further, the second magnetic layer 26 does not contain a resin. In this example, the second magnetic layer 26 is a sintered body obtained by sintering and solidifying a magnetic material. As the magnetic material contained in the second magnetic layer 26, for example, ferrite can be used. In this case, the sintered body of ferrite can be used as the second magnetic layer 26. When the sintered body is used as the second magnetic layer 26 as described above, the second magnetic layer 26 does not contain a resin.

Examples of the ferrite include nickel zinc ferrite and manganese zinc ferrite. Ferrites such as nickel zinc ferrite and manganese zinc ferrite have higher relative magnetic permeability and lower loss than metal magnetic powders. Therefore, acquisition efficiency of inductance of the inductor component 10 can be increased by containing ferrite in the specified portion 20.

Note that ferrite is a material based on iron oxide. That is, ferrite is an oxide and not a metal. Here, the iron-based metal magnetic powder is defined as a "first magnetic material", and a part containing the first magnetic material in the specified portion 20 is defined as a "first magnetic portion". Ferrite is defined as a "second magnetic material", and a part containing the second magnetic material in the specified portion 20 is defined as a "second magnetic portion". In this case, in this example, the first magnetic layer 25 corresponds to the first magnetic portion, and the second magnetic layer 26 corresponds to the second magnetic portion. That is, it can be said that the first magnetic portion and the second magnetic portion constitute layers in the specified portion 20.

Figure 4:
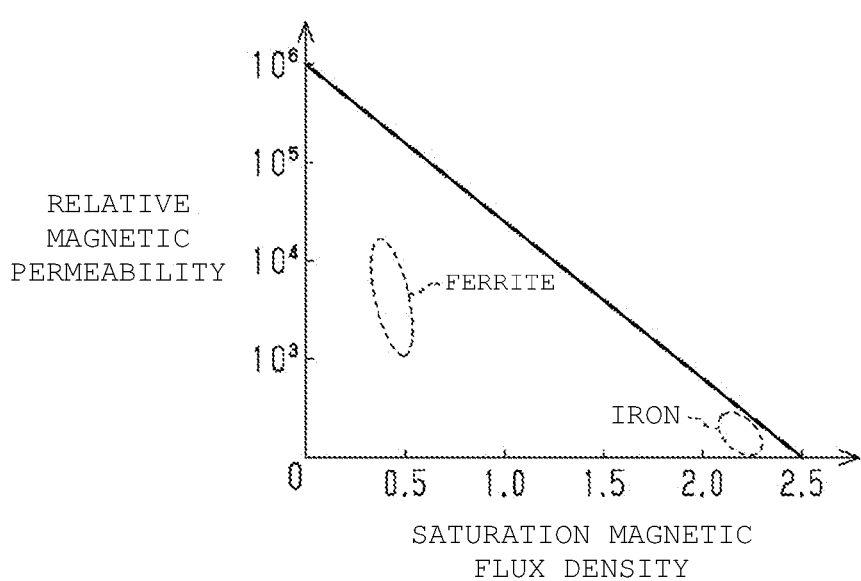
FIG. 4 is a graph illustrating a relationship between a saturation magnetic flux density and magnetic permeability.

FIG. 4 illustrates a relationship between magnetic saturation density and magnetic permeability in the iron-based metal magnetic powder and ferrite. When the magnetic material alone is observed, as shown in FIG. 4, the relative magnetic permeability of the iron-based metal magnetic powder is lower than the relative magnetic permeability of ferrite. For example, the relative magnetic permeability of ferrite is "$10^3$" or more, whereas the relative magnetic permeability of the iron-based metal magnetic powder is less than "$10^3$". Specifically, the relative magnetic permeability of iron as an example of the iron-based metal magnetic powder is about "5,000".

In this example, the first magnetic layer 25 containing iron-based metal magnetic powder has a relative magnetic permeability of about "10". The second magnetic layer 26 containing ferrite has a relative magnetic permeability of about "750". That is, the relative magnetic permeability of the second magnetic layer 26 is "400" or more, and is "ten times" or more the relative magnetic permeability of the first magnetic layer 25. Since the relative magnetic permeability is different by "ten times" or more between the first magnetic layer 25 and the second magnetic layer 26, the saturation magnetic flux density of the first magnetic layer 25 can be made larger than the saturation magnetic flux density of the second magnetic layer 26 by about a predetermined value. The predetermined value is "0.5 (T)" or more and "0.8 (T)" or less (i.e., from "0.5 (T)" to "0.8 (T)"). The relative magnetic permeability described here is a measurement result when a frequency at measurement of the relative magnetic permeability is "1 (MHz)".

Next, characteristics of the inductor component 10 will be described.

Figure 5:
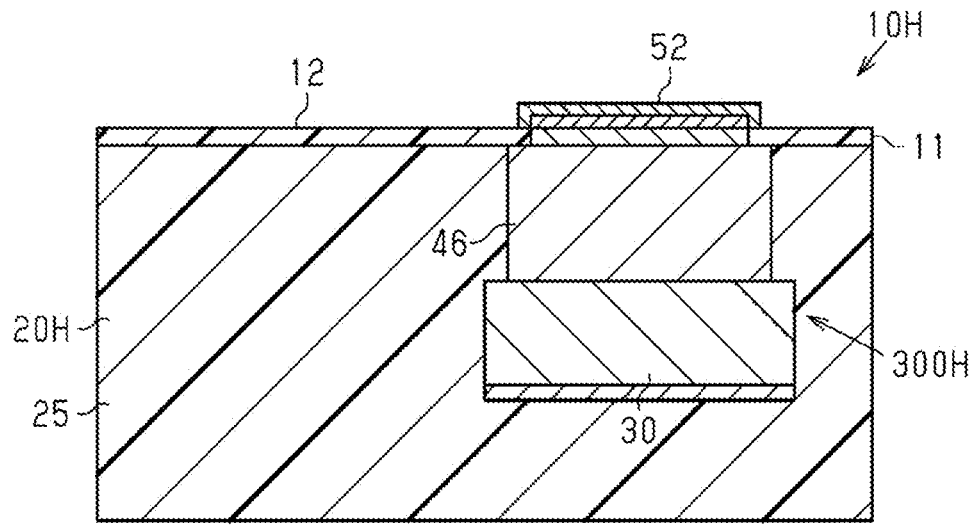
FIG. 5 is a sectional view of an inductor component according to a comparative example.

First, an inductor component 10H according to a comparative example will be described with reference to FIG. 5. As illustrated in FIG. 5, a specified portion 20H of the inductor component 10H according to the comparative example includes the first magnetic portion but does not include the second magnetic portion. That is, at a position corresponding to the second magnetic layer 26 of the specified portion 20H, the second magnetic portion containing the second magnetic material but not containing the first magnetic material does not exist, and the first magnetic portion exists.

Figure 6:
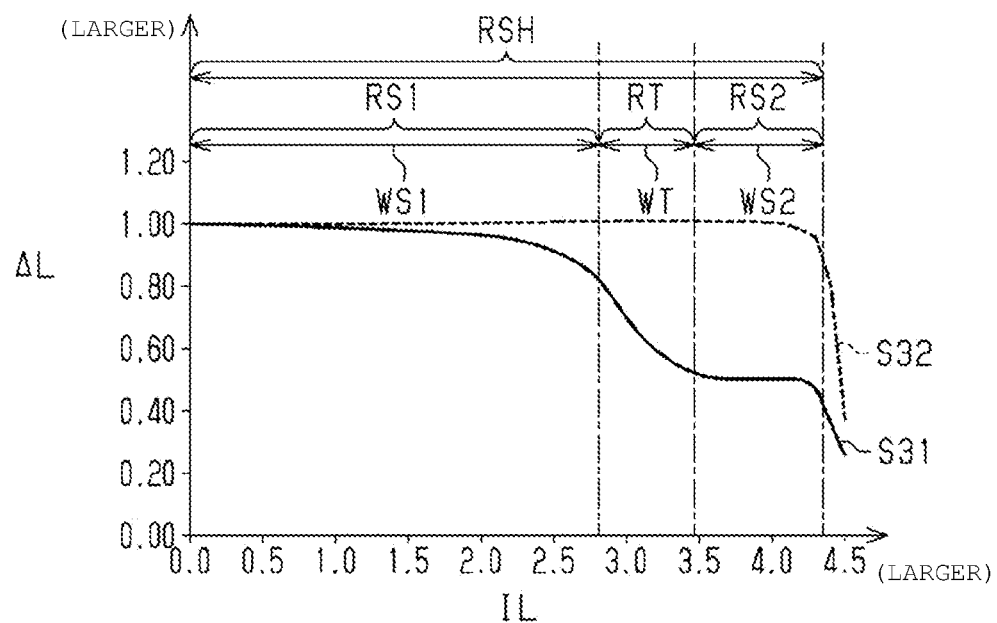
FIG. 6 is a graph illustrating a DC superposition characteristic curve in an inductor of an inductor component.

FIG. 6 illustrates a DC superposition characteristic curve of the inductor 300 of the inductor component 10 of this example and a DC superposition characteristic curve of the inductor 300H of the inductor component 10H of the comparative example. The DC superposition characteristic curve is a line indicating a relationship between a value of a DC bias current IL and a relative value ΔL of an inductance L. That is, the DC superposition characteristic curve is indicated as a value with respect to the DC bias current IL superimposed on an alternating current when the alternating current of "100 (MHz)" flows through the inductor. The DC bias current IL is a component of a constant current (that is, direct current) excluding an AC component in a current input to the inductor. The alternating current is an alternating current having a constant amplitude sufficiently small for neither the inductor component 10 of this example nor the inductor component 10H of the comparative example to be magnetically saturated. In the DC superposition characteristic curve, a horizontal axis represents the value of the DC bias current IL, and a vertical axis represents the relative value ΔL of the inductance L.

The relative value ΔL of the inductance L is a relative value of the inductance when the value of the inductance L when the value of the DC bias current IL is "0 A" is "1", that is, when the relative value ΔL is a reference value. Further, a region where a fluctuation in the relative value ΔL on the vertical axis is within "0.1" over an interval of "0.3 A" or more on the DC bias current IL on the horizontal axis is referred to as a "steady region". A region where the fluctuation on the vertical axis exceeds "0.1" in an interval of less than "0.3 A" on the horizontal axis is referred to as a "transition region".

A solid line S31 in FIG. 6 indicates a DC superposition characteristic curve in the inductor 300 of the inductor component 10 of this example. A broken line S32 in FIG. 6 indicates a DC superposition characteristic curve in the inductor 300H of the inductor component 10H of the comparative example. Since the vertical axis represents the relative value ΔL of the inductance L, the value of the inductance L when the value of the DC bias current IL is "0 A" is larger than the value of the inductance L when the value of the DC bias current IL of the inductor 300H is "0 A" in the DC superposition characteristic curve of the inductor 300, which is not illustrated in FIG. 6.

As illustrated in FIG. 6, the DC superposition characteristic curve in the inductor 300H of the inductor component 10H of the comparative example has one steady region RSH extending over a wide range from a region where the value of the DC bias current IL is low to a region where the value is high. The DC superposition characteristic curve in the inductor 300 of the inductor component 10 of this example has a plurality of steady regions RS1 and RS2. That is, of the plurality of steady regions of the inductor component 10, a first steady region RS1 is a steady region when the value of the DC bias current IL is relatively small, and a second steady region RS2 is a steady region when the value of the DC bias current IL is relatively large. The value of the DC bias current IL serving as a lower limit of the second steady region RS2 is larger than the value of the DC bias current IL serving as an upper limit of the first steady region RS1.

A width WS1 of an interval on the horizontal axis of the first steady region RS1 and a width WS2 of an interval on the horizontal axis of the second steady region RS2 are "0.3 A" or more. The width of the interval on the horizontal axis of the steady region is a difference between the value of the DC bias current IL serving as the lower limit of the steady region and the value of the DC bias current IL serving as the upper limit of the steady region. In the actual DC superposition characteristic curve, it may be difficult to clearly set the values of the DC bias current IL serving as the upper and lower limits of the steady region, but it is not necessary to strictly obtain the widths of the intervals, and it is sufficient to determine whether the widths of the intervals are "0.3 A" or more and whether the widths of the intervals are larger or smaller than other steady regions.

In this example, the width WS1 of the interval on the horizontal axis of the first steady region RS1 is wider than the width WS2 of the interval on the horizontal axis of the second steady region RS2. That is, the width WS1 of the interval on the horizontal axis of the first steady region RS1 is "0.5 A" or more, whereas the width WS2 of the interval on the horizontal axis of the second steady region RS2 is less than "0.5 A".

For example, the value of the DC bias current IL as the lower limit of the first steady region RS1 is "0". That is, the first steady region RS1 is a region including "0 (A)" on the horizontal axis. In the DC superposition characteristic curve of the inductor 300 of the inductor component 10 of this example, the transition region RT interposed between the first steady region RS1 and the second steady region RS2 exists. The transition region RT is the region in which the fluctuation on the vertical axis exceeds "0.1" in the interval less than "0.3 (A)" on the horizontal axis.

When, of the first steady region RS1 or the second steady region RS2, a steady region having an interval with a larger width on the horizontal axis is defined as a "wide steady region", a width WT of an interval on the horizontal axis of the transition region RT is smaller than a width of an interval on the horizontal axis of the wide steady region. Specifically, the width WT of the interval on the horizontal axis of the transition region RT is less than or equal to "⅓" of the width of the interval on the horizontal axis of the wide steady region. In this example, as is clear from FIG. 6, the first steady region RS1 corresponds to the wide steady region. Therefore, the width WT of the interval on the horizontal axis of the transition region RT is less than or equal to "⅓" of the width WS1 of the interval on the horizontal axis of the first steady region RS1.

Figure 7:
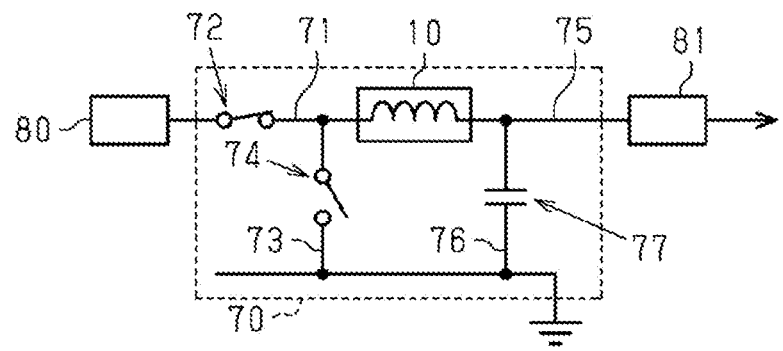
FIG. 7 is a circuit diagram for describing an outline of a DC-DC converter including the inductor component in the first embodiment.

Next, a DC-DC converter 70 including the inductor component 10 of this example will be described with reference to FIG. 7. As illustrated in FIG. 7, the DC-DC converter 70 includes the inductor component 10 and a switching element 72 provided on a wire 71 that electrically connects a DC power supply 80 and the inductor component 10. A wire 73 connected to a ground is connected to the wire 71, and a switching element 74 is disposed on the wire 73. A wire 76 connected to the ground is connected to a wire 75 that connects the inductor component 10 and a load resistor 81, and a capacitor 77 is disposed on the wire 76. Examples of the switching elements 72 and 74 include MOS-FETs.

In this case, by controlling turning on and off of the switching elements 72 and 74, a magnitude of a DC voltage input from the DC power supply 80 to the inductor component 10 of the DC-DC converter 70 can be adjusted and output.

In the present embodiment, the following functions and effects can be obtained.

(1-1) The DC superposition characteristic curve of the inductor 300 of the inductor component 10 includes the first steady region RS1, the second steady region RS2, and the transition region RT. This means that magnetic saturation occurs in two stages when the value of the DC bias current IL is gradually increased from "0". That is, in the DC superposition characteristic curve of the inductor 300, of the first steady region RS1 and the second steady region RS2, the value of the magnetically saturated DC bias current IL is low but the value of the inductance L is high in the first steady region RS1, whereas the value of the inductance L is low but the value of the magnetically saturated DC bias current IL is high in the second steady region RS2. By configuring the inductor component 10 such that the inductor 300 has such a DC superposition characteristic curve, for example, when the inductor component 10 is used as a power inductor of the DC-DC converter 70, generation of ripples can be suppressed by the first steady region RS1 at a light load, efficiency of voltage conversion can be improved, and a large current can be handled by the second steady region RS2.

(1-2) In the DC superposition characteristic curve of the inductor 300 of the inductor component 10, the width WS1 of the interval on the horizontal axis of the first steady region RS1 is more than or equal to "0.5 A". As described above, by increasing the width WS1 of the interval on the horizontal axis of the first steady region RS1, the effect of suppressing the value of the DC bias current IL from deviating to outside of the first steady region RS1 can be enhanced although the value of the DC bias current IL fluctuates in a state where the value of the DC bias current IL is included in the first steady region RS1. By adjusting the content of the iron-based metal magnetic powder in the first magnetic layer 25, the width WS1 of the interval on the horizontal axis of the first steady region RS1 can be adjusted.

(1-3) In the DC superposition characteristic curve of the inductor 300 of the inductor component 10, the width WS1 of the interval on the horizontal axis of the first steady region RS1 is larger than the width WS2 of the interval on the horizontal axis of the second steady region RS2. Considering efficiency of the DC-DC converter 70 equipped with the inductor component 10, the inductance L hardly contributes to the efficiency of the DC-DC converter 70 in a current region where the value of the DC bias current IL is large. Thus, the influence caused by the fluctuation in the inductance L is smaller than the influence caused by the fluctuation in the inductance L when the value of the DC bias current IL is small. On the other hand, in a current region where the value of the DC bias current IL is small, the inductance L greatly contributes to the efficiency of the DC-DC converter 70. Therefore, by making the width WS1 of the interval on the horizontal axis of the first steady region RS1 larger than the width WS2 of the interval on the horizontal axis of the second steady region RS2, performance of the inductor component 10 can be improved.

(1-4) In the DC superposition characteristic curve of the inductor 300 of the inductor component 10, the width WT of the interval on the horizontal axis of the transition region RT is set to less than or equal to "⅓" of the width WS1 of the interval on the horizontal axis of the first steady region RS1. By decreasing the width WT of the interval on the horizontal axis of the transition region RT in this way, it is possible to narrow a region of the value of the DC bias current IL that lowers the performance of the inductor component 10. In other words, the region of the value of the DC bias current IL in which the inductor component 10 can be used can be widened.

(1-5) By providing a magnetic layer having a relative magnetic permeability of "400" or more in the specified portion 20 of the body 200, magnetic saturation can easily occur. As a result, in the DC superposition characteristic curve of the inductor 300 of the inductor component 10, the width WT of the transition region RT can be decreased.

(1-6) The inductor component 10 includes the first magnetic portion containing the first magnetic material and the second magnetic portion containing the second magnetic material. In the inductor component 10, the first magnetic layer 25 containing the iron-based metal magnetic powder corresponds to the first magnetic portion, and the second magnetic layer 26 containing ferrite corresponds to the second magnetic portion. When the specified portion 20 includes the first magnetic portion and the second magnetic portion, the DC superposition characteristic curve of the inductor 300 can be adjusted by adjusting a ratio of the first magnetic portion and the second magnetic portion. As a result, the plurality of steady regions RS1 and RS2 having different regions of the value of the DC bias current IL can exist in the DC superposition characteristic curve of the inductor 300.

(1-7) The first magnetic layer 25 containing the iron-based metal magnetic powder, which is provided in the specified portion 20 of the body 200, can make superposition characteristics of the inductor component 10 favorable.

(1-8) The specified portion 20 of the body 200 has the plurality of magnetic layers 25 and 26 having different relative magnetic permeability by "ten times" or more. As a result, the saturation magnetic flux density of the first magnetic layer 25 can be made larger than the saturation magnetic flux density of the second magnetic layer 26 by about "0.5 (T)" to "0.8 (T)". In this way, the specified portion 20, which includes the plurality of magnetic materials having a large difference in relative magnetic permeability, can adjust a magnitude of the inductance L, the widths WS1 and WS2 of the intervals on the horizontal axis of the steady regions RS1 and RS2, and the width WT of the interval on the horizontal axis of the transition region RT.

(1-9) In the inductor component 10, the thickness T1 of the first magnetic layer 25 having low relative magnetic permeability is larger than the thickness T2 of the second magnetic layer 26 having high relative magnetic permeability. As a result, the width WS1 of the interval on the horizontal axis of the first steady region RS1 can be increased.

(1-10) In the inductor component 10, the average particle diameter of the iron-based metal magnetic powder contained in the first magnetic layer 25 is "1 (µm)" or more and "10 (µm)" or less (i.e., from "1 (µm)" to "10 (µm)"). The filling rate of the iron-based metal magnetic powder is "50 (wt %)" or more and "90 (wt %)" or less (i.e., from "50 (wt %)" to "90 (wt %)"). When the alternating current is input to the inductor 300 of the inductor component 10, the value of the inductance L of the inductor component 10 can be reduced, and consequently, increase in size of the inductor component 10 can be suppressed.

Next, an example of the method for manufacturing the inductor component 10 will be described with reference to FIGS. 8 to 18. The method described here is a method using a semi-additive method for forming the inductor wire 30.

Figure 8:
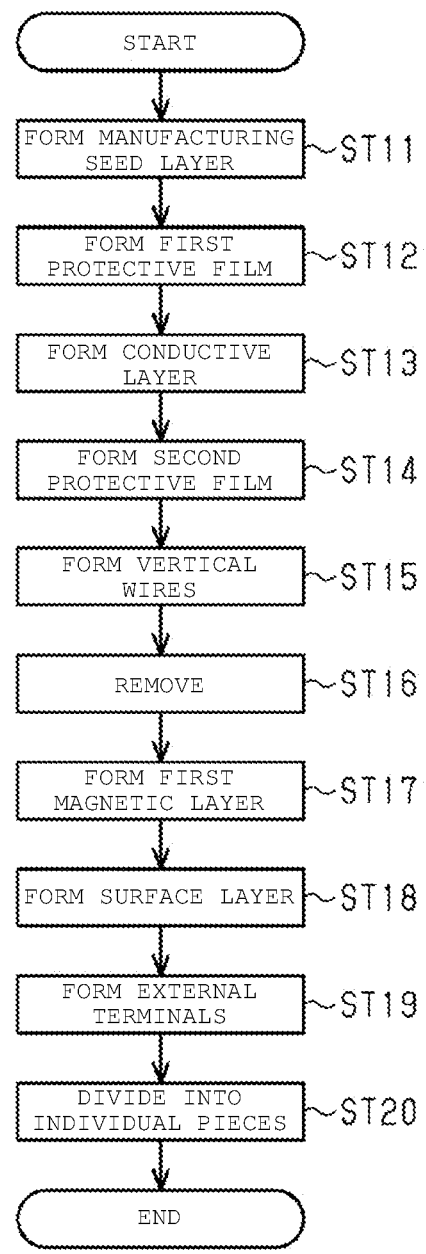
FIG. 8 is a flowchart for describing an example of a method for manufacturing an inductor component.
Figure 9:
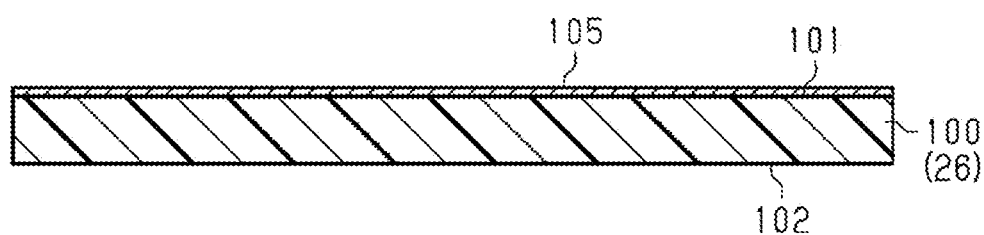
FIG. 9 is an explanatory diagram of the method.

As illustrated in FIG. 8, in a first step ST11, a manufacturing seed layer 105 is formed on a substrate 100. As illustrated in FIG. 9, the substrate 100 has a plate shape. The substrate 100 is a sintered body obtained by sintering ferrite. As will be described in detail later, the substrate 100 can constitute the second magnetic layer 26 of the inductor component 10. In FIG. 9, an upper surface of the substrate 100 is referred to as a front surface 101, and a lower surface of the substrate 100 is referred to as a back surface 102. Then, the manufacturing seed layer 105 is formed on the substrate 100 so as to cover the entire front surface 101 of the substrate 100. For example, the manufacturing seed layer 105 containing copper is formed by sputtering. For example, the manufacturing seed layer 105 having a thickness of about "200 nm" is formed. As will be described in detail later, a part of the manufacturing seed layer 105 serves as the seed layer 41 of the inductor wire 30.

Figure 10:
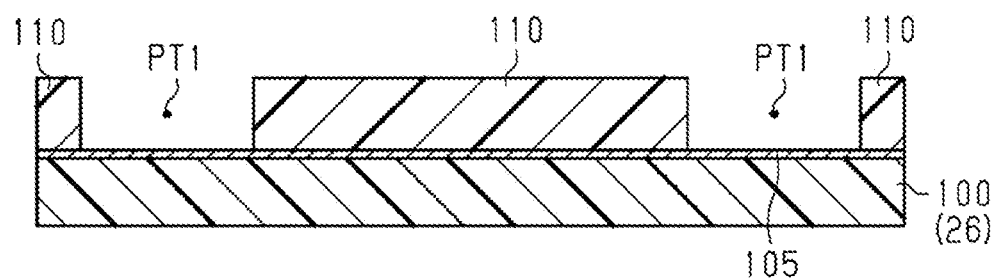
FIG. 10 is an explanatory diagram of the method.

When the formation of the manufacturing seed layer 105 is completed, the next step ST12 is performed. In step ST12, a first protective film 110 is formed on the manufacturing seed layer 105 by, for example, photolithography as illustrated in FIG. 10. In this case, a photoresist is applied over the entire front surface of the manufacturing seed layer 105. For example, a photoresist is applied onto the manufacturing seed layer 105 by spin coating. Subsequently, exposure using an exposure device is performed. As a result, a part of the photoresist corresponding to a position where the conductive layer 42 is to be formed can be removed by development processing to be described later, and the other parts of the photoresist are cured. When a negative resist is employed as the photoresist, an exposed part of the photoresist is cured, and the other parts of the photoresist can be removed. On the other hand, when a positive resist is employed as the photoresist, the exposed part of the photoresist can be removed, and the other parts of the photoresist are cured. By controlling the part of the photoresist to be exposed, a portion of a part attached on the manufacturing seed layer 105 can be cured. Subsequently, as illustrated in FIG. 10, a part of the photoresist corresponding to the position where the conductive layer 42 is to be formed is removed by development processing using a developer. A cured part of the photoresist remains on the manufacturing seed layer 105 as the first protective film 110. By patterning the first protective film 110 on the manufacturing seed layer 105 in this way, a wiring pattern PT1 is formed. The wiring pattern PT1 has an opening shape corresponding to a shape of the inductor wire 30 of the inductor component 10.

Figure 11:
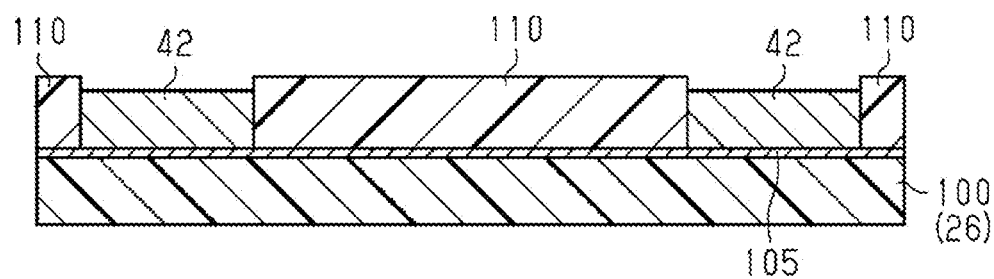
FIG. 11 is an explanatory diagram of the method.

When the formation of the first protective film 110 is completed, the next step ST13 is performed. In step ST13, the conductive layer 42 as illustrated in FIG. 11 is formed by supplying a conductive material into the wiring pattern PT1. For example, by performing electrolytic copper plating using a copper sulfate aqueous solution, copper is mainly deposited on an exposed part of the manufacturing seed layer 105. Thus, the conductive layer 42 is formed. Since the copper sulfate aqueous solution is used, the conductive layer 42 contains a trace amount of sulfur. The inductor wire 30 is formed by a part of the manufacturing seed layer 105 with which the conductive layer 42 is in contact and the conductive layer 42. At this time, the dummy wire 43 is also formed together with the inductor wire 30. Note that the part of the manufacturing seed layer 105 in contact with the conductive layer 42 serves as the seed layer 41 of the inductor wire 30.

When a magnetic layer in which the inductor wire 30 is formed on a surface is defined as a "base magnetic layer", the substrate 100 corresponds to the base magnetic layer. Each processing in steps ST11 to ST13 corresponds to a "step of forming the inductor wire on the base magnetic layer".

Figure 12:
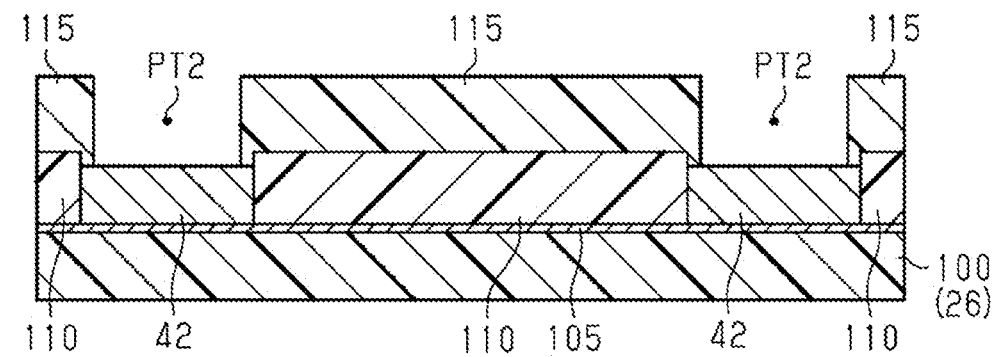
FIG. 12 is an explanatory diagram of the method.

When the formation of the conductive layer 42 is completed, the next step ST14 is performed. In step ST14, a second protective film 115 is formed by, for example, photolithography as illustrated in FIG. 12. In this case, a photoresist is applied so as to cover the first protective film 110 and the conductive layer 42. Subsequently, exposure using an exposure device is performed. As a result, parts of the photoresist corresponding to positions where the vertical wires 45 and 46 of the inductor 300 are to be formed can be removed by development processing to be described later, and the other parts of the photoresist are cured. Subsequently, the uncured part of the photoresist is removed by development processing using a developer, and the cured part remains as the second protective film 115. By patterning the second protective film 115 on the first protective film 110 and the conductive layer 42 in this way, a vertical pattern PT2 is formed. The vertical pattern PT2 has an opening shape corresponding to a shape of the vertical wires 45 and 46.

Figure 13:
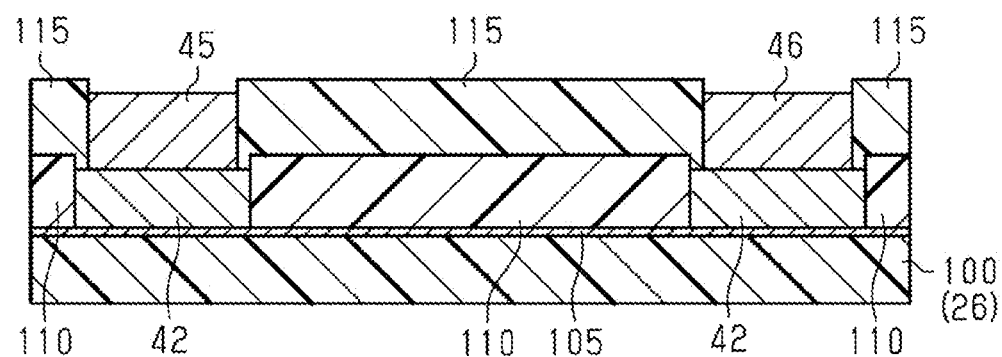
FIG. 13 is an explanatory diagram of the method.

When the formation of the second protective film 115 is completed, the next step ST15 is performed. In step ST15, the vertical wires 45 and 46 are formed as illustrated in FIG. 13. For example, by performing electrolytic copper plating using a copper sulfate aqueous solution, the conductive material is supplied into the vertical pattern PT2, and thus the vertical wires 45 and 46 can be formed. In this case, by supplying power to the inductor wire 30 with the dummy wire 43 interposed therebetween, copper as a conductive material is supplied into the vertical pattern PT2. When the copper sulfate aqueous solution is used as described above, the vertical wires 45 and 46 contain a trace amount of sulfur.

Figure 14:
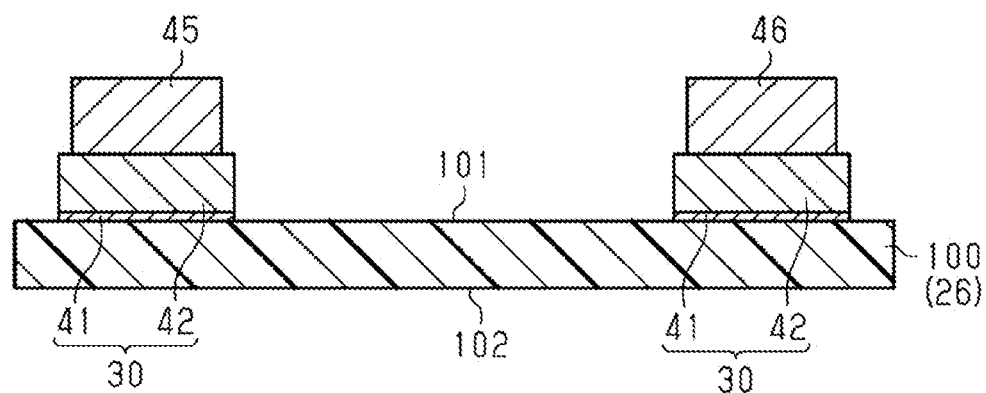
FIG. 14 is an explanatory diagram of the method.

When the formation of the vertical wires 45 and 46 is completed, the next step ST16 is performed. In step ST16, as illustrated in FIG. 14, removal processing is performed. First, the first protective film 110 and the second protective film 115 are removed by processing using a peeling solution. When the removal of the protective films 110 and 115 is completed, the part of the manufacturing seed layer 105 that has been in contact with the first protective film 110 is removed. For example, the part of the manufacturing seed layer 105 that has been in contact with the first protective film 110 is removed by wet etching. As a result, only a part of the manufacturing seed layer 105 to be the seed layer 41 of the inductor wire 30 remains.

Figure 15:
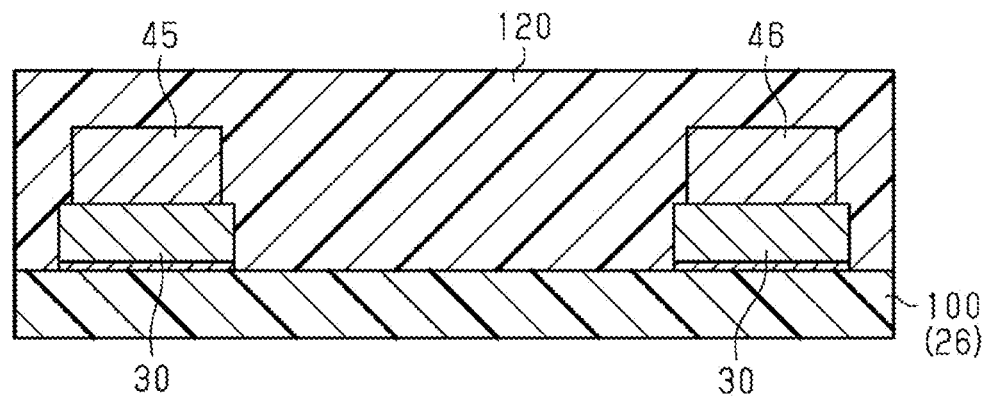
FIG. 15 is an explanatory diagram of the method.
Figure 16:
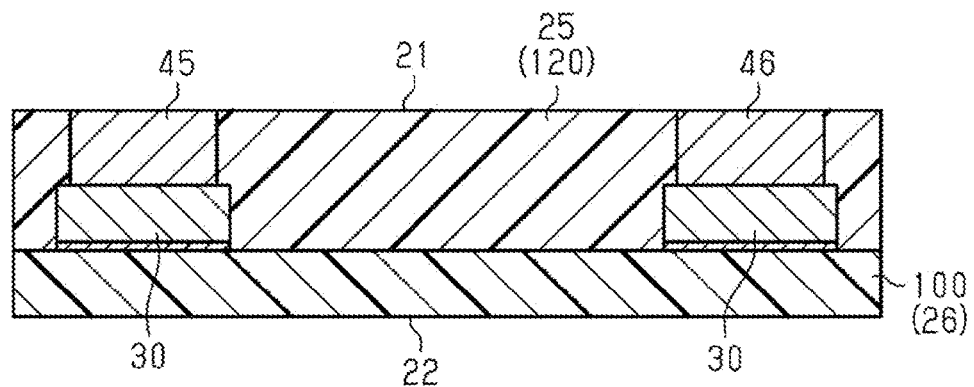
FIG. 16 is an explanatory diagram of the method.

When the removal processing is completed, the next step ST17 is performed. In step ST17, the first magnetic layer 25 is formed. That is, as illustrated in FIG. 15, a magnetic sheet 120 is pressed against the substrate 100 from above in the drawing. At this time, a plurality of the magnetic sheets 120 may be pressed against the substrate 100 in the up-down direction in the drawing. In a state where the magnetic sheet 120 is pressed against the substrate 100, end surfaces of the vertical wires 45 and 46 are covered with the magnetic sheet 120. Therefore, as illustrated in FIG. 16, the magnetic sheet 120 is ground until the end surfaces of the vertical wires 45 and 46 are exposed to outside. As a result, the first magnetic layer 25 is formed.

As described above, the relative magnetic permeability of the first magnetic layer 25 is different from the relative permeability of the substrate 100 (second magnetic layer 26) corresponding to the base magnetic layer. When a magnetic layer having relative magnetic permeability different from the relative permeability of the base magnetic layer among the magnetic layers formed on the base magnetic layer is defined as an "overlaid magnetic layer", the first magnetic layer 25 corresponds to the overlaid magnetic layer. In step ST17, the inductor wire 30 is covered by forming the first magnetic layer 25 as the overlaid magnetic layer on the substrate 100 corresponding to the base magnetic layer. Therefore, step ST17 corresponds to a "step of covering the inductor wire by forming the overlaid magnetic layer on the base magnetic layer".

Figure 17:
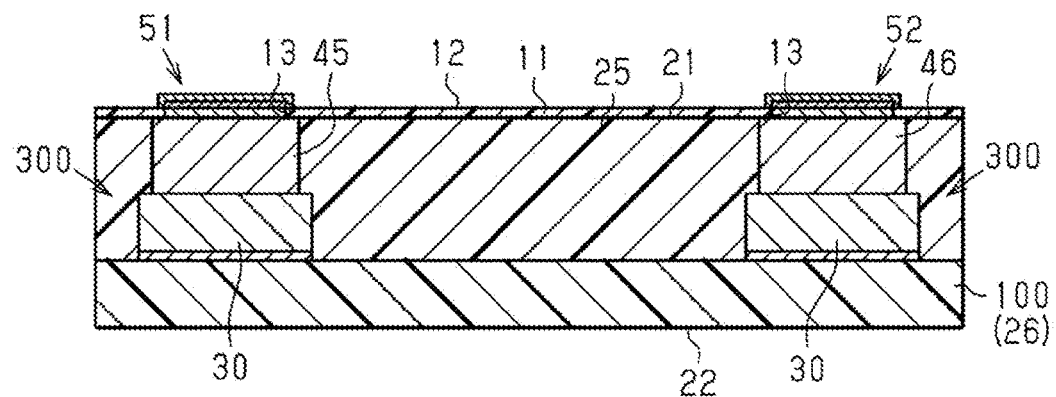
FIG. 17 is an explanatory diagram of the method.

When the formation of the first magnetic layer 25 is completed, the next step ST18 is performed. In step ST18, the surface layer 11 is formed on the first magnetic layer 25 as illustrated in FIG. 17. For example, the surface layer 11 can be formed by applying a polyimide varnish containing a trifluoromethyl group and silsesquioxane onto the first magnetic layer 25 by spin coating. In this state, each of the vertical wires 45 and 46 is also covered with the surface layer 11. Thus, in the surface layer 11, the through hole 13 is formed at each of positions where the external terminals 51 and 52 are formed. For example, the through hole 13 can be formed by irradiating the surface layer 11 with a laser beam. The surface layer 11 may be formed by patterning the polyimide varnish on an upper surface in the drawing by photolithography. In this case, since the surface layer 11 having the through hole 13 can be formed by photolithography, a step of forming the through hole 13 using a laser can be omitted.

When the formation of the surface layer 11 is completed, the next step ST19 is performed. In step ST19, as illustrated in FIG. 17, the external terminals 51 and 52 are formed. That is, step ST19 corresponds to a "step of forming the external terminals electrically connected to the inductor wire".

Figure 18:
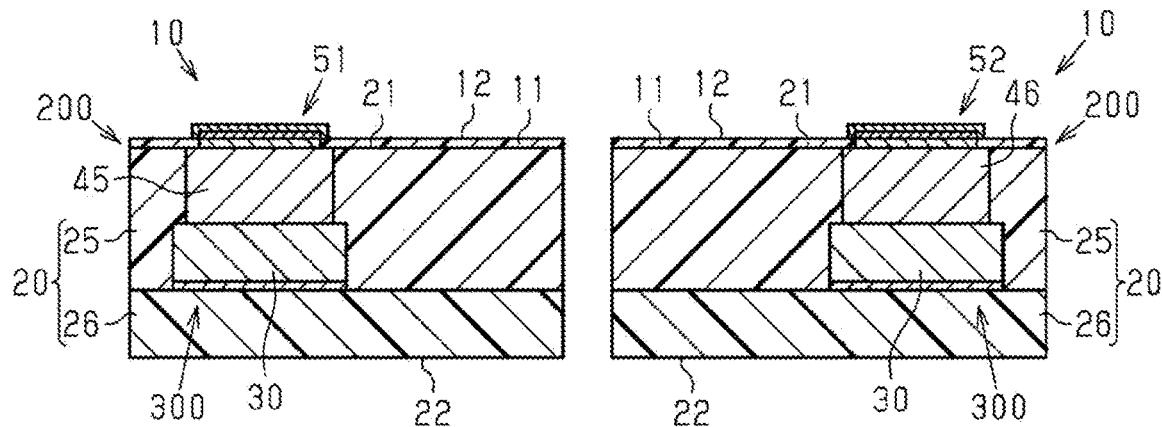
FIG. 18 is an explanatory diagram of the method.

When the formation of the external terminals 51 and 52 is completed, the next step ST20 is performed. In step ST20, as illustrated in FIG. 18, the product created in the processing in steps ST11 to ST19 is divided into individual pieces by cutting with a dicing machine or the like. Thus, a plurality of the inductor components 10 are manufactured. Then, a series of processing constituting the method for manufacturing the inductor component 10 is completed.

That is, in this method, the specified portion 20 of the body 200 is formed by forming the first magnetic layer 25 and the second magnetic layer 26. The body 200 is formed by forming the surface layer 11 on the specified portion 20.

In this method, at least one of the following items (A1) to (A7) is to be different when the first magnetic layer 25 and the second magnetic layer 26 are formed. Thus, the first steady region RS1 and the second steady region RS2 can exist as the steady region in the DC superposition characteristic curve of the inductor 300, and the transition region RT can exist between the first steady region RS1 and the second steady region RS2.

(A1) The relative magnetic permeability of the first magnetic layer 25 and the relative magnetic permeability of the second magnetic layer 26.

(A2) A volume of the first magnetic layer 25 and a volume of the second magnetic layer 26.

(A3) A positional relationship between the first magnetic layer 25 and the inductor 300 (in particular, the inductor wire 30), and a positional relationship between the second magnetic layer 26 and the inductor 300 (in particular, the inductor wire 30).

(A4) A composition of the magnetic material contained in the first magnetic layer 25 and a composition of the magnetic material contained in the second magnetic layer 26.

(A5) A particle diameter of the magnetic material contained in the first magnetic layer 25 and a particle diameter of the magnetic material contained in the second magnetic layer 26.

(A6) The composition of the magnetic material contained in the first magnetic layer 25 and the composition of the magnetic material contained in the second magnetic layer 26.

(A7) A content of the magnetic material in the first magnetic layer 25 and a content of the magnetic material in the second magnetic layer 26.

Second Embodiment

Next, a second embodiment of an inductor component and a manufacturing method will be described with reference to FIGS. 19 to 26. In the following description, parts different from those of the first embodiment will be mainly described, the same reference numerals will be given to the same or corresponding member configurations as those of the first embodiment, and redundant description will be omitted.

Figure 19:
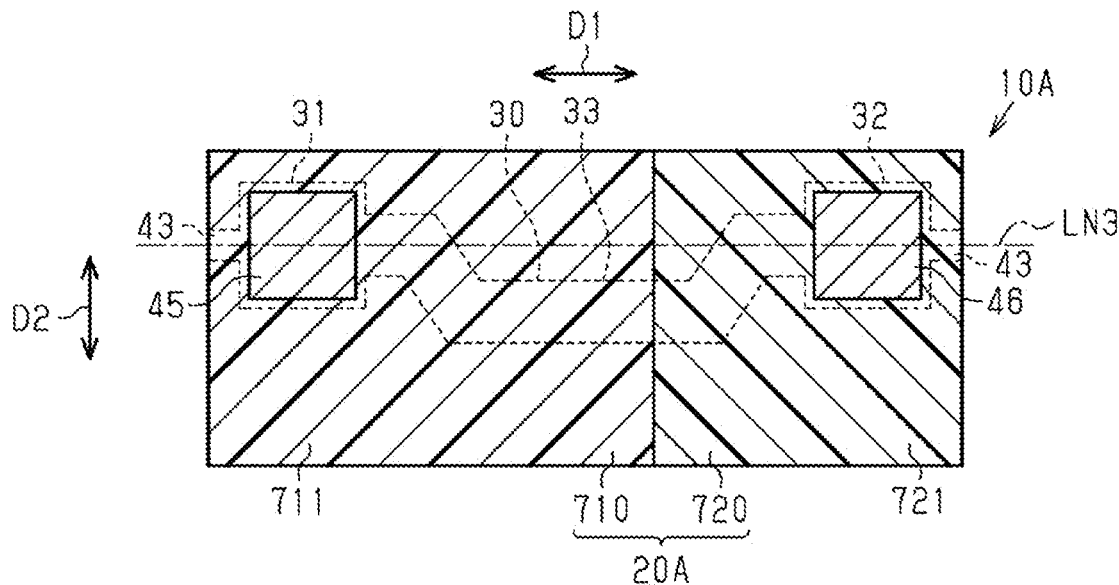
FIG. 19 is a schematic sectional view of an inductor component according to a second embodiment.
Figure 20:
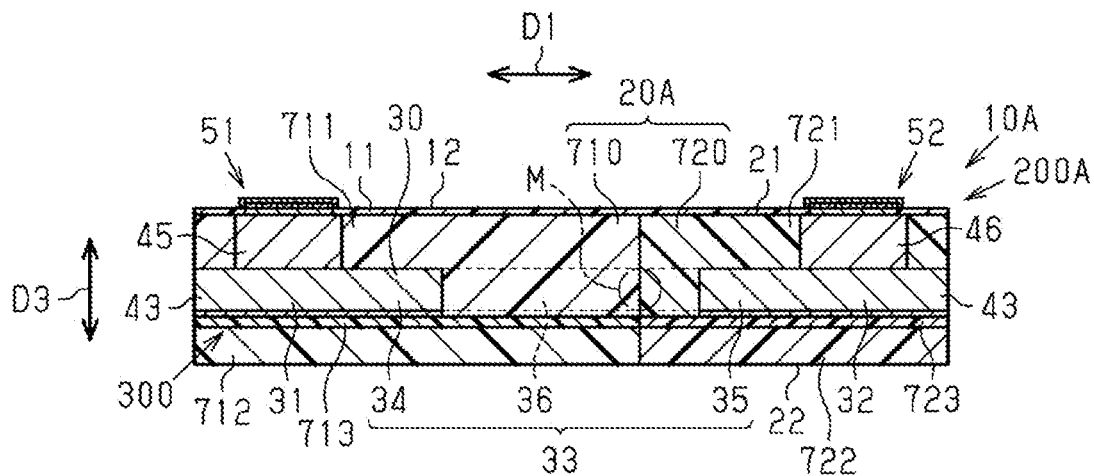
FIG. 20 is a sectional view of the inductor component.

FIG. 19 is a diagram illustrating a section of an inductor component 10A when the vertical wires 45 and 46 are cut in a direction orthogonal to the third direction D3. FIG. 20 is a diagram illustrating a section of the inductor component 10A taken along a line LN3 indicated by an alternate long and short dash line in FIG. 19. The line LN3 is a straight line extending in the first direction D1. That is, the section illustrated in FIG. 20 is a plane orthogonal to the second direction D2.

As illustrated in FIGS. 19 and 20, the inductor component 10A includes a body 200A and the inductor 300. The body 200A includes a specified portion 20A and the surface layer 11. The inductor 300 includes the inductor wire 30, the vertical wires 45 and 46, and the external terminals 51 and 52.

The specified portion 20A includes a first region 710 and a second region 720 arranged in the first direction D1 orthogonal to the third direction D3. A part of the wiring body 33 and the first end 31 of the inductor wire 30 are located in the first region 710. The remaining part of the wiring body 33 and the second end 32 of the inductor wire 30 are located in the second region 720.

The first region 710 has a plurality of layers laminated in the third direction D3. Among the plurality of layers, a first magnetic layer 711 encloses the inductor wire 30 and the vertical wire 45. The first magnetic layer 711 is in contact with the surface layer 11. Among the plurality of layers, a first magnetic layer 712 is disposed opposite to the surface layer 11 across the first magnetic layer 711. Among the plurality of layers, a first insulating layer 713 is disposed between the first magnetic layer 711 and the first magnetic layer 712. In this example, the first insulating layer 713 is in contact with the lower surface of the inductor wire 30 in FIG. 20.

The second region 720 has the plurality of layers laminated in the third direction D3. Among the plurality of layers, a second magnetic layer 721 encloses the inductor wire 30 and the vertical wire 46. The second magnetic layer 721 is in contact with the surface layer 11. In addition, the second magnetic layer 721 is in contact with the first magnetic layer 711 of the first region 710. Among the plurality of layers, a second magnetic layer 722 is disposed opposite to the surface layer 11 across the second magnetic layer 721. The second magnetic layer 722 is in contact with the first magnetic layer 712 of the first region 710. Among the plurality of layers, a second insulating layer 723 is disposed between the second magnetic layer 721 and the second magnetic layer 722. The second insulating layer 723 is in contact with the first insulating layer 713 of the first region 710. Specifically, the second insulating layer 723 is integrated with the first insulating layer 713, and the second insulating layer 723 and the first insulating layer 713 constitute one insulating layer. In this example, the second insulating layer 723 is in contact with the lower surface of the inductor wire 30 in FIG. 20.

The first magnetic layers 711 and 712 contain the first magnetic material but does not contain the second magnetic material. The second magnetic layers 721 and 722 contain the second magnetic material but does not contain the first magnetic material.

The first magnetic layers 711 and 712 contain an iron-based metal magnetic powder as the first magnetic material. That is, the first magnetic layers 711 and 712 include a resin containing iron-based metal magnetic powder.

The second magnetic layers 721 and 722 contain a magnetic powder different from the iron-based metal magnetic powder as the second magnetic material. That is, the second magnetic layers 721 and 722 include a resin containing magnetic powder different from iron-based metal magnetic powder. Examples of the magnetic powder different from the iron-based metal magnetic powder include nickel, chromium, copper, aluminum, and alloys thereof. The second magnetic layers 721 and 722 may include a resin containing ferrite powder instead of metal magnetic powder as the second magnetic material.

That is, in the specified portion 20A of the body 200A, a part containing the first magnetic material is defined as a first magnetic portion, and a part containing the second magnetic material is defined as a second magnetic portion. In this example, the first magnetic layers 711 and 712 correspond to the first magnetic portion, and the second magnetic layers 721 and 722 correspond to the second magnetic portion. Therefore, in the inductor component 10A, the first magnetic portion that is a part containing the first magnetic material and the second magnetic portion that is a part containing the second magnetic material are in contact with each other in the first direction D1 as a direction orthogonal to the third direction D3.

Figure 21:
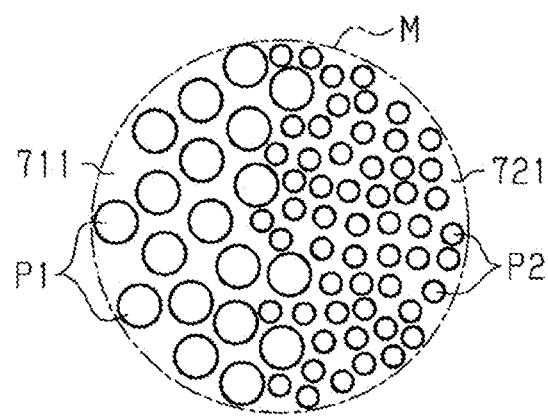
FIG. 21 is a schematic enlarged view of a part of FIG. 20.

FIG. 21 is an enlarged schematic view of a section M surrounded by an alternate long and short dash line in FIG. 20. As illustrated in FIG. 21, at a boundary between the first magnetic layer 711 and the second magnetic layer 721, a magnetic powder P1 contained in the first magnetic layer 711 enters the second magnetic layer 721, and a magnetic powder P2 contained in the second magnetic layer 721 enters the first magnetic layer 711. Therefore, the boundary between the first magnetic layer 711 and the second magnetic layer 721 has an uneven shape.

Similarly, at a boundary between the first magnetic layer 712 and the second magnetic layer 722, a magnetic powder contained in the first magnetic layer 712 enters the second magnetic layer 722, and a magnetic powder contained in the second magnetic layer 722 enters the first magnetic layer 712. Therefore, the boundary between the first magnetic layer 712 and the second magnetic layer 722 has an uneven shape.

The first insulating layer 713 and the second insulating layer 723 are non-magnetic insulators. The first insulating layer 713 and the second insulating layer 723 contain, for example, a polyimide resin, an acrylic resin, an epoxy resin, a phenol resin, and a liquid crystal polymer. In order to enhance insulation performance of the first insulating layer 713 and the second insulating layer 723, the first insulating layer 713 and the second insulating layer 723 may contain an insulating filler such as a silica filler.

In a DC superposition characteristic curve of the inductor 300A of the inductor component 10A of this example, there are a plurality of steady regions. Among the plurality of steady regions, the first steady region RS1 is a steady region when the value of the DC bias current IL is relatively small, and the second steady region RS2 is a steady region when the value of the DC bias current IL is relatively large. The value of the DC bias current IL serving as a lower limit of the second steady region RS2 is larger than the value of the DC bias current IL serving as an upper limit of the first steady region RS1. Therefore, in the inductor component 10A, effects equal to the first embodiment can be obtained.

Figure 22:
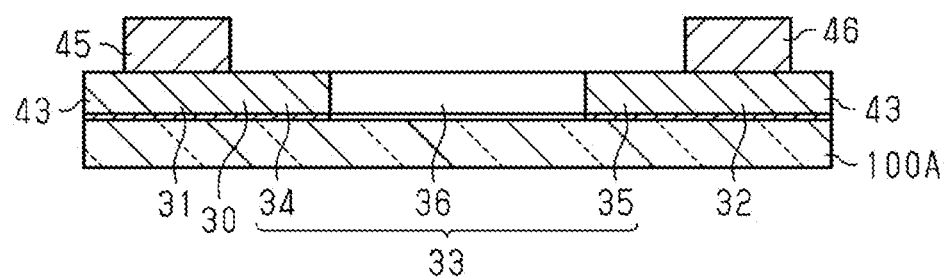
FIG. 22 is an explanatory diagram of a method for manufacturing the inductor component.

Next, a part of an example of a method for manufacturing the inductor component 10A will be described with reference to FIGS. 22 to 26. By performing the processing in steps ST11 to ST16 in FIG. 8, as illustrated in FIG. 22, the inductor wire 30 is formed on the substrate 100A, and the vertical wires 45 and 46 connected to the inductor wire 30 are formed. In the present embodiment, examples of the substrate 100A include a ceramic plate.

Figure 23:
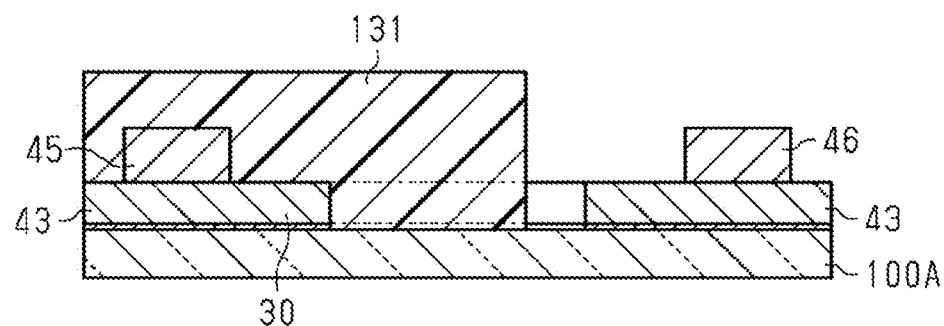
FIG. 23 is an explanatory diagram of the method.
Figure 24:
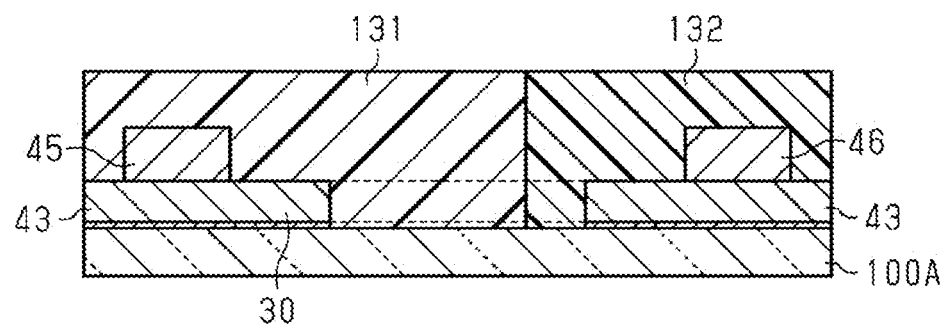
FIG. 24 is an explanatory diagram of the method.

When the formation of the vertical wires 45 and 46 is completed, in the next step, as illustrated in FIG. 23, a paste containing the first magnetic material is applied onto the substrate 100A so as to cover a part of the inductor wire 30 including the first end 31 and the vertical wire 45. Then, the paste is cured. A cured product 131 of the paste constitutes the first magnetic layer 711. Subsequently, as illustrated in FIG. 24, a paste containing the second magnetic material is applied onto the substrate 100A so as to cover a part of the inductor wire 30 including the second end 32 and the vertical wire 46. Then, the paste is cured. A cured product 132 of the paste constitutes the second magnetic layer 721. Thus, the inductor wire 30 is covered.

Figure 25:
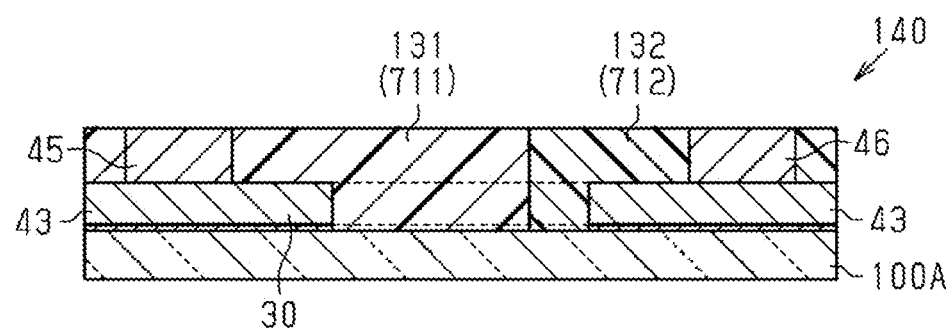
FIG. 25 is an explanatory diagram of the method.

In a state illustrated in FIG. 24, the respective end surfaces of the vertical wires 45 and 46 are not exposed to outside. Therefore, as illustrated in FIG. 25, the cured products 131 and 132 are ground such that the respective end surfaces of the vertical wires 45 and 46 are exposed to outside. When the grinding is completed, the substrate 100A is removed by the grinding to form an intermediate product 140.

When the removal of the substrate 100A is completed, the first insulating layer 713 and the second insulating layer 723 are formed in the next step. For example, the first insulating layer 713 and the second insulating layer 723 can be formed by applying a polyimide varnish containing a trifluoromethyl group and silsesquioxane to the intermediate product 140 by spin coating. As a result, the lower surface of the inductor wire 30 in FIG. 25 is covered with the first insulating layer 713 and the second insulating layer 723.

In the next step, the first magnetic layer 712 is formed. For example, a paste containing the first magnetic material is applied onto the first insulating layer 713. The paste is the same as the paste used to form the cured product 131. The paste applied here is cured to form a cured product 141. Then, the first magnetic layer 712 is formed by adjusting a shape of the cured product 141. As a result, as illustrated in FIG. 26, the first region 710 including the first magnetic layer 711, the first insulating layer 713, and the first magnetic layer 712 is formed.

Subsequently, the second magnetic layer 722 is formed. For example, a paste containing the second magnetic material is applied onto the second insulating layer 723. The paste is the same as the paste used to form the cured product 132. The paste applied here is cured to form a cured product 142. Then, the second magnetic layer 722 is formed by adjusting a shape of the cured product 142. As a result, as illustrated in FIG. 26, the second region 720 including the second magnetic layer 721, the second insulating layer 723, and the second magnetic layer 722 is formed.

Figure 26:
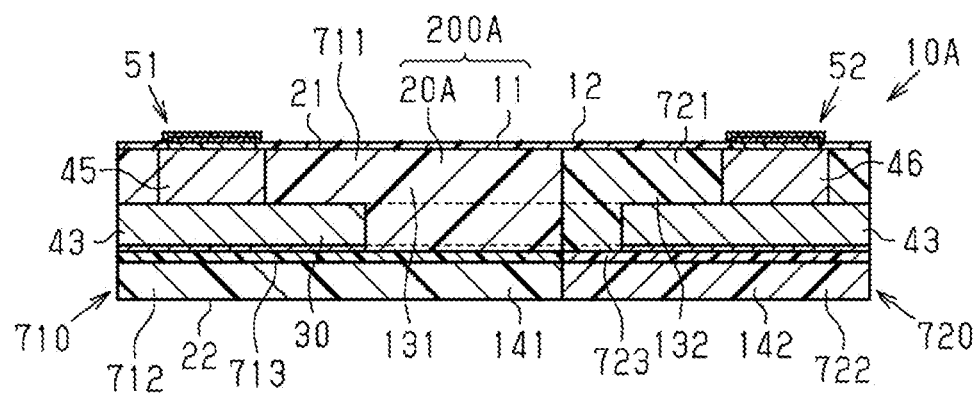
FIG. 26 is an explanatory diagram of the method.

Thereafter, as shown in FIG. 26, the surface layer 11 is formed, and then the external terminals 51 and 52 are formed. A method for forming the surface layer 11 and a method for forming the external terminals 51 and 52 are the same as the methods described in the first embodiment.

Third Embodiment

Next, a third embodiment of an inductor component and a DC-DC converter will be described with reference to FIGS. 27 to 29. In the following description, parts different from those of the first embodiment will be mainly described, the same reference numerals will be given to the same or corresponding member configurations as those of the first embodiment, and redundant description will be omitted.

Figure 27:
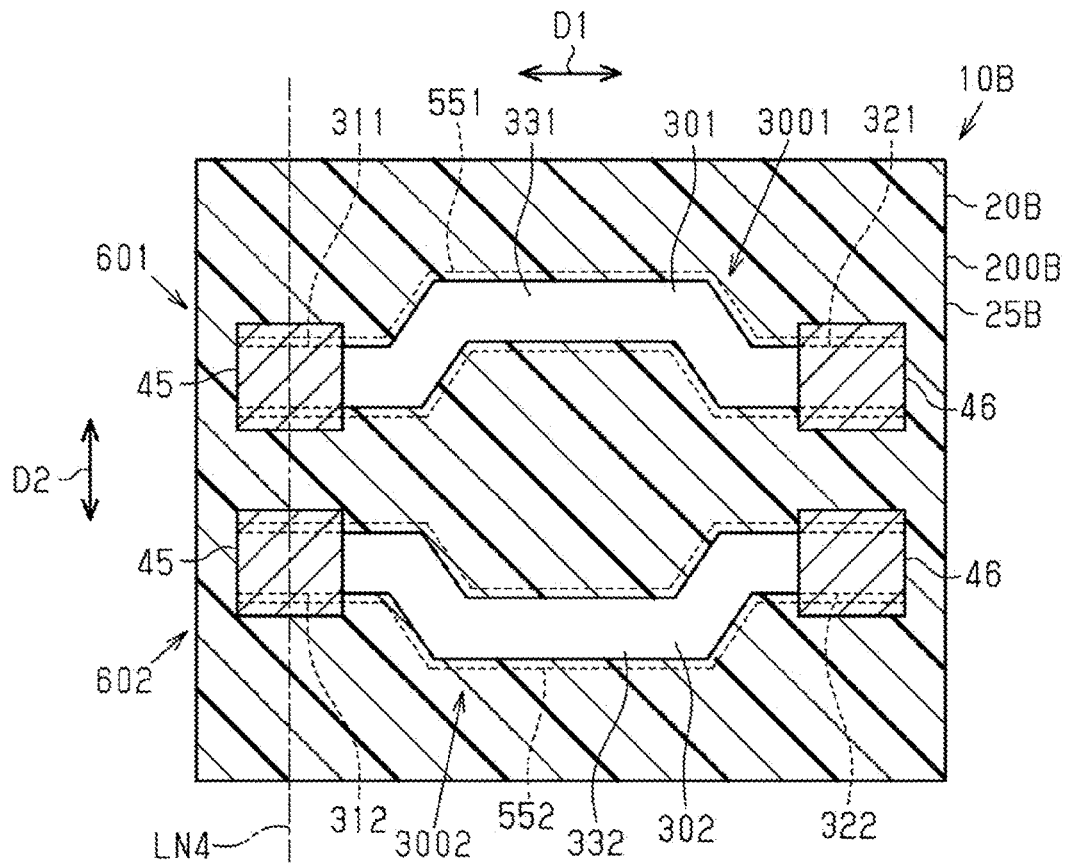
FIG. 27 is a schematic sectional view of an inductor component according to a third embodiment.

FIG. 27 is a diagram illustrating a section of an inductor component 10B when the vertical wires 45 and 46 are cut in a direction orthogonal to the third direction D3. FIG. 28 is a diagram illustrating a section of the inductor component 10B taken along a line LN4 indicated by an alternate long and short dash line in FIG. 27. The line LN4 is a straight line extending in the second direction D2. That is, the section illustrated in FIG. 28 is a plane orthogonal to the first direction D1.

Figure 28:
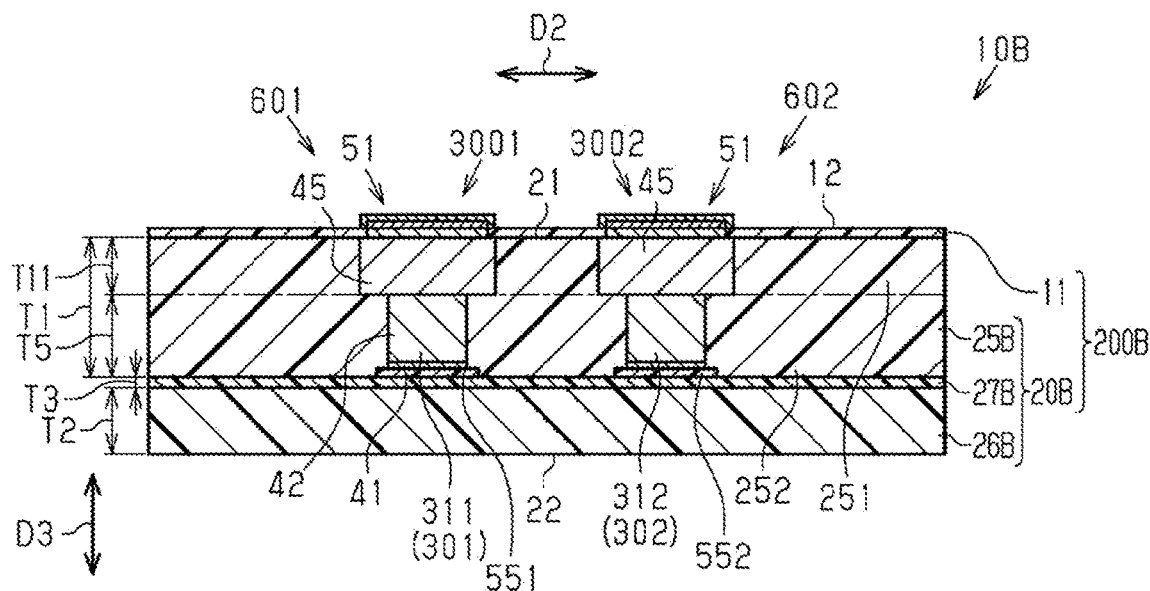
FIG. 28 is a sectional view of the inductor component.
Figure 29:
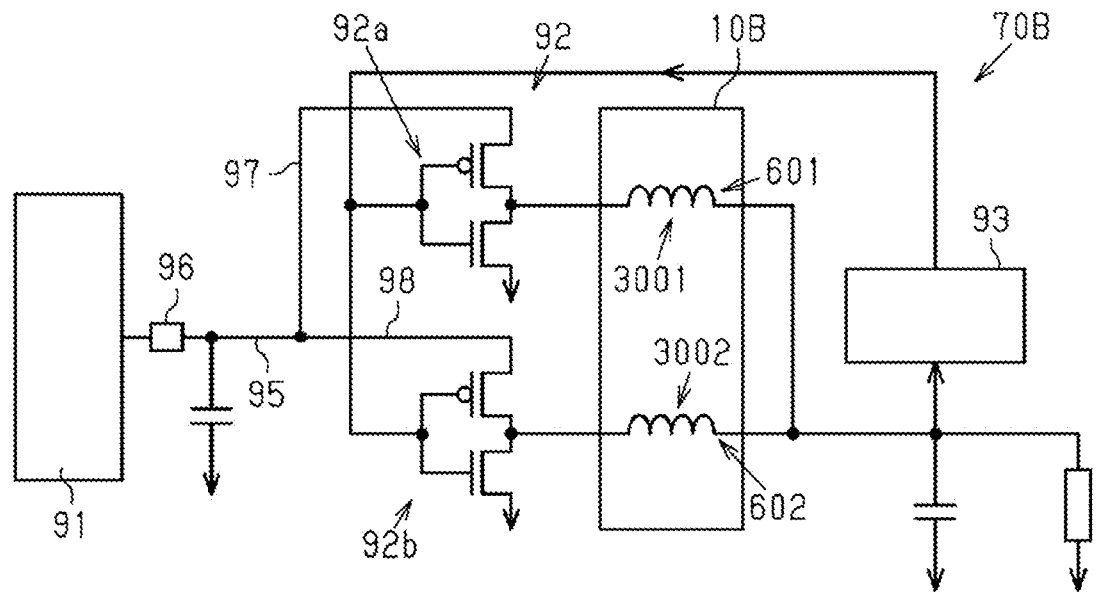
FIG. 29 is a circuit diagram for describing an outline of a DC-DC converter including the inductor component in the third embodiment.

As illustrated in FIGS. 27 and 28, the inductor component 10B is an array inductor component having a plurality of inductors 3001 and 3002 not electrically connected to each other in a body 200B.

Among the inductors 3001 and 3002, the first inductor 3001 has a first inductor wire 301. The first inductor wire 301 includes a first end 311 to which the vertical wire 45 is connected, a second end 321 to which the vertical wire 46 is connected, and a wiring body 331 connecting the first end 311 and the second end 321.

Among the inductors 3001 and 3002, the second inductor 3002 has a second inductor wire 302. The second inductor wire 302 has a first end 312 to which the vertical wire 45 is connected, a second end 322 to which the vertical wire 46 is connected, and a wiring body 332 connecting the first end 312 and the second end 322.

In FIG. 27, a dummy wire connected to the inductor wire 301 and a dummy wire connected to the inductor wire 302 are not illustrated. As illustrated in FIG. 28, the body 200B includes a specified portion 20B and the surface layer 11. The specified portion 20B has a plurality of magnetic layers laminated in the third direction D3. That is, the specified portion 20B includes a first magnetic layer 25B in contact with the surface layer 11, a second magnetic layer 26B located opposite to the surface layer 11 across the first magnetic layer 25B, and a third magnetic layer 27B interposed between the first magnetic layer 25B and the second magnetic layer 26B. The inductor wires 301 and 302 are provided in the first magnetic layer 25B. In the first magnetic layer 25B, an insulating layer 551 interposed between the inductor wire 301 and the third magnetic layer 27B and an insulating layer 552 interposed between the inductor wire 302 and the third magnetic layer 27B are provided. The insulating layers 551 and 552 are in contact with the inductor wire 301 and 302, respectively, and also the third magnetic layer 27B.

The first magnetic layer 25B contains an iron-based metal magnetic powder as the first magnetic material. For example, the first magnetic layer 25B includes a resin containing iron-based metal magnetic powder. The second magnetic layer 26B does not contain iron-based metal magnetic powder but contains the second magnetic material. For example, the second magnetic layer 26B contains ferrite as the second magnetic material. A layer not containing a resin may be adopted as the second magnetic layer 26B. In this case, a sintered body obtained by sintering ferrite may be adopted as the second magnetic layer 26B.

The third magnetic layer 27B does not contain iron-based metal magnetic powder or ferrite, but contains a third magnetic material. Examples of the third magnetic material include metal magnetic powder other than iron or iron alloy. In this example, the third magnetic layer 27B has a relative magnetic permeability of "1" or more and "2" or less (i.e., from "1" to "2").

In the specified portion 20B, a part containing the first magnetic material is defined as a "first magnetic portion", a part containing the second magnetic material is defined as a "second magnetic portion", and a part containing the third magnetic material is defined as a "third magnetic portion". In this case, in this example, the first magnetic layer 25B corresponds to the first magnetic portion, and the second magnetic layer 26B corresponds to the second magnetic portion. The third magnetic layer 27B corresponds to the third magnetic portion. That is, the third magnetic layer 27B is the third magnetic portion constituting a layer.

The first magnetic layer 25B can be divided into the magnetic portion 251 on surface layer side and the magnetic portion 252 on counter surface layer side. When a plane including a boundary between the inductor wires 301 and 302 and the vertical wire 45 among planes parallel to the main surface 12 is a boundary plane, a part of the first magnetic layer 25B closer to the surface layer 11 than the boundary plane is the magnetic portion 251 on surface layer side. In the first magnetic layer 25B, a part closer to the third magnetic layer 27B than the boundary plane is the magnetic portion 252 on counter surface layer side. The thickness T11 of the magnetic portion 251 on surface layer side is preferably equal to the thickness T2 of the second magnetic layer 26B. As a result, the thickness T1 of the first magnetic layer 25B increases as the thickness T5 of the inductor wires 301 and 302 increases. When the thickness T1 of the first magnetic layer 25B can be made larger than the thickness T2 of the second magnetic layer 26B, the thickness T11 of the magnetic portion 251 on surface layer side may be larger than the thickness T2 of the second magnetic layer 26B or smaller than the thickness T2.

When a dimension of the third magnetic layer 27B in the third direction D3 is the thickness T3 of the third magnetic layer 27B, the thickness T3 of the third magnetic layer 27B is thinner than both the thickness T1 of the first magnetic layer 25B and the thickness T2 of the second magnetic layer 26B.

In the inductor component 10B, a region including the first inductor 3001 is defined as a first inductor component 601, and a region including the second inductor 3002 is defined as a second inductor component 602. In the above configuration, the first steady region RS1, the second steady region RS2, and the transition region RT exist in both a DC superposition characteristic curve of the first inductor 3001 and a DC superposition characteristic curve of the second inductor 3002. Therefore, in the inductor component 10B, effects equal to the first embodiment can be obtained.

Next, a multiphase DC-DC converter 70B equipped with the inductor component 10B will be described with reference to FIG. 29. The DC-DC converter 70B includes a VRM 91 and a switching circuit 92. The VRM is an abbreviation of a "voltage regulator module". An input terminal 96 is provided on a wire 95 connecting the VRM 91 and the switching circuit 92. That is, the input terminal 96 is electrically connected to the VRM 91 as a DC power supply. In the DC-DC converter 70B, an output signal (current) from the VRM 91 is input to the inductor component 10B with the input terminal 96 and the switching circuit 92 interposed therebetween. The switching circuit 92 includes the same number of switching elements 92a and 92b as the inductors 3001 and 3002 in the inductor component 10B. The switching elements 92a and 92b are arranged in parallel. Examples of the switching elements 92a and 92b include MOS-FETs. Then, a signal (current) is input to the inductors 3001 and 3002 of the inductor component 10B through the switching element 92a or 92b that is an electrically connected switching element. That is, the switching element 92a is provided on a wire 97 that electrically connects the input terminal 96 and the inductor 3001. The switching element 92b is provided on a wire 98 that electrically connects the input terminal 96 and the inductor 3002.

A switching element electrically connected to the first inductor 3001 is defined as a "first switching element", and a switching element electrically connected to the second inductor 3002 is defined as a "second switching element". In this case, the switching element 92a corresponds to the first switching element, and the switching element 92b corresponds to the second switching element.

The DC-DC converter 70B is provided with a controller 93 that controls turning on and off of the switching elements 92a and 92b on the basis of a magnitude of a current output from the inductor component 10B. That is, the controller 93 selects an inductor to which a current is input from the inductors 3001 and 3002.

For example, the controller 93 can shift a phase between on and off of the switching element 92a and on and off of the switching element 92b by "360°/N (where N is a natural number of 2 or more)".

(Modification)

The above embodiments can be modified as follows. The above embodiments and the following modifications can be implemented in combination with each other so as not to technically contradict.

In the first embodiment, the specified portion 20 of the body 200 may include an insulating layer as long as a plurality of layers are laminated in the third direction D3. In this case, in the specified portion 20, the insulating layer may be disposed between the first magnetic layer 25 and the second magnetic layer 26. The insulating layer may be in contact with the inductor wire 30 or may not be in contact with the inductor wire 30.

When the insulating layer in contact with the inductor wire 30 is provided in the specified portion 20, as long as a part of the insulating layer is located in the first magnetic layer 25, the remaining part of the insulating layer may be located in the second magnetic layer 26.

In the first and second embodiments, the inductor components 10 and 10A may have a configuration in which the inductor wire 30 covered with an insulating film is provided in the specified portions 20 and 20A, respectively. In this case, the vertical wire has a via penetrating the insulating film and a columnar wire located in the specified portions 20 and 20A.

In the first embodiment, the specified portion 20 may be a laminated body in which three or more magnetic layers are laminated. In this case, the inductor component 10 can be configured such that three or more steady regions exist in the DC superposition characteristic curve of the inductor by configuring the magnetic layers to contain magnetic materials different from each other. In this case, the transition region is interposed between the steady regions adjacent to each other on the horizontal axis.

In the second embodiment, the specified portion 20A of the body 200A may have three or more magnetic portions arranged in the first direction D1. In this case, the inductor component 10A can be configured such that three or more steady regions exist in the DC superposition characteristic curve of the inductor 300 by configuring the magnetic portions containing magnetic materials different from each other.

In the second embodiment, the specified portion 20A of the body 200A may have a plurality of magnetic portions arranged in the second direction D2. In this case, by configuring the magnetic portions to contain magnetic materials different from each other, a plurality of steady regions can exist in the DC superposition characteristic curve of the inductor 300A.

Figure 30:
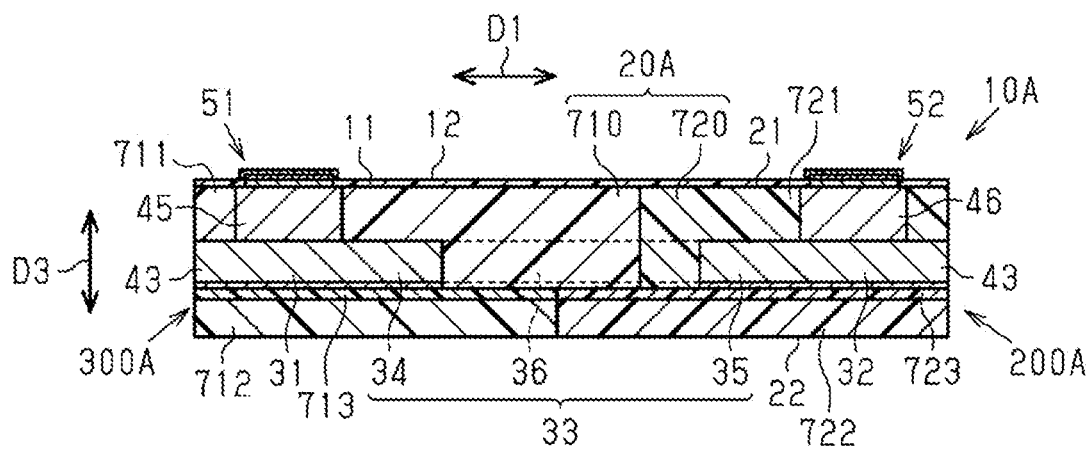
FIG. 30 is a sectional view of an inductor component according to a modification.

In the second embodiment, the specified portion 20A of the body 200A may be configured such that a boundary between the second region 720 and the first region 710 is in a state as illustrated in FIG. 30. That is, the boundary between the first magnetic layer 711 and the second magnetic layer 721 and the boundary between the first magnetic layer 712 and the second magnetic layer 722 may be deviated in the first direction D1.

In the second embodiment, the first insulating layer 713 and the second insulating layer 723 may not be provided in the specified portion 20A of the body 200A. In the second embodiment, the first magnetic layer 712 and the second magnetic layer 722 may include the same material. In this case, there is no distinction between the first magnetic layer 712 and the second magnetic layer 722.

Figure 31:
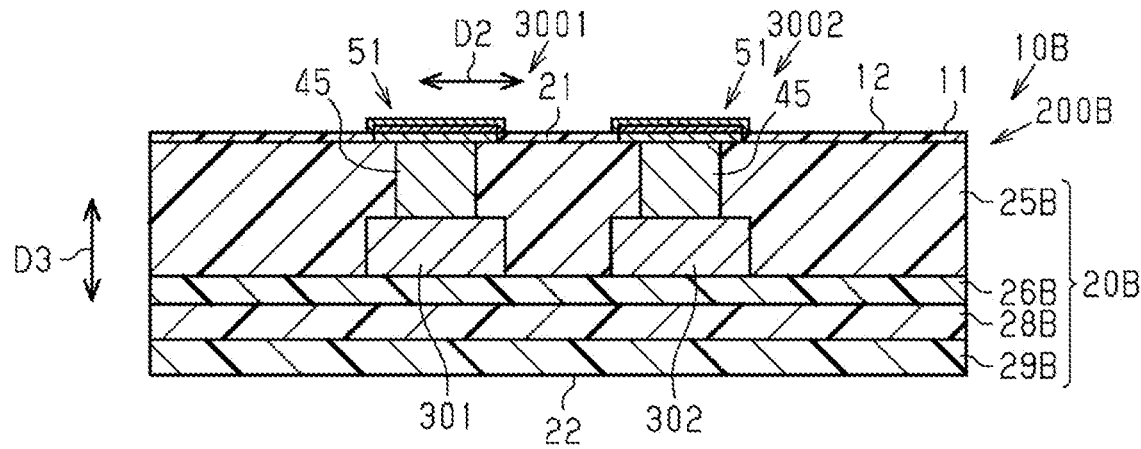
FIG. 31 is a sectional view of an inductor component according to a modification.

In the third embodiment, as illustrated in FIG. 31, the insulating layers 551 and 552 in contact with the inductor wires 301 and 302, respectively, may not be provided in the specified portion 20B of the body 200B. In the third embodiment, the relative magnetic permeability of the third magnetic layer 27B located between the first magnetic layer 25B and the second magnetic layer 26B may be larger than "two".

In the third embodiment, an insulating layer instead of the third magnetic layer 27B may be interposed between the first magnetic layer 25B and the second magnetic layer 26B. In the third embodiment, the specified portion 20B of the body 200B may be a laminated body in which four or more magnetic layers are laminated. In this case, as illustrated in FIG. 31, a thickness of each of the remaining magnetic layers 28B and 29B other than the first magnetic layer 25B and the second magnetic layer 26B may be substantially equal to the thickness T2 of the second magnetic layer 26. The thickness of each of the remaining magnetic layers 28B and 29B may be larger than the thickness T2 of the second magnetic layer 26.

Figure 32:
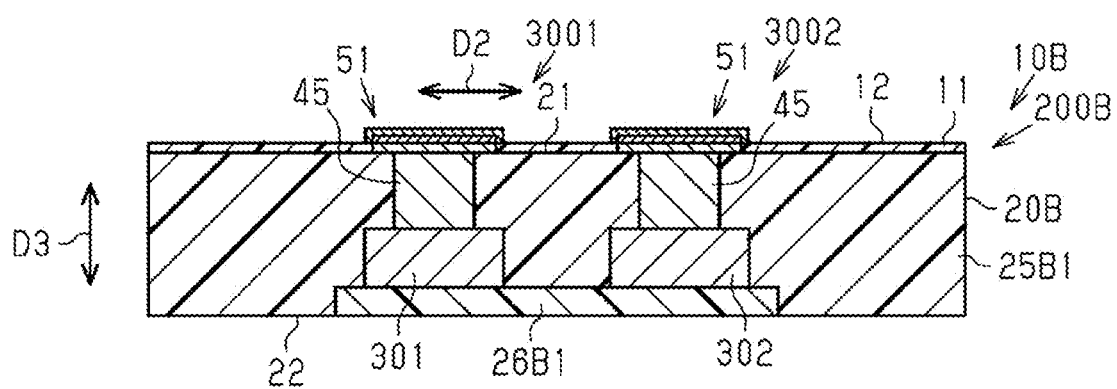
FIG. 32 is a sectional view of an inductor component according to a modification.

In the third embodiment, the specified portion 20B of the body 200B may have a configuration other than the configuration in which the plurality of magnetic layers are laminated as long as the specified portion 20B has the plurality of magnetic portions. For example, as illustrated in FIG. 32, a substrate 26B1 on which the inductor wires 301 and 302 are placed and a sealing body 25B1 that seals the substrate 26B1, the inductor wires 301 and 302, and the vertical wires 45 and 46 may constitute the specified portion 20B. In this case, for example, a sintered body of ferrite is adopted as the substrate 26B1, and the sealing body 25B1 is constituted by a resin containing iron-based metal magnetic powder. Thus, the first steady region RS1 and the second steady region RS2 can exist in the DC superposition characteristic curve of each of the inductors 3001 and 3002. In this case, the sealing body 25B1 corresponds to the first magnetic portion, and the substrate 26B1 corresponds to the second magnetic portion.

In the embodiments, the external terminals may not be laminated bodies. In the embodiments, the inductor wires may have a shape different from the shape described in the embodiments. A structure, shape, material, and the like of the inductor wires are not limited as long as the inductor wires can impart inductance to the inductor component by generating a magnetic flux around the inductor wires when a current flows. The inductor wires may be wires having various known wire shapes such as a spiral shape of "1 turn" or more, a curved shape of less than "1.0 turns", and a winding meander shape.

Here, the number of turns of the inductor wires is determined on the basis of a virtual vector. A start point of the virtual vector is disposed on a virtual center line extending in an extending direction of each inductor wire through a center of a wire width of each inductor wire. The virtual vector is in contact with the virtual center line extending in the extending direction of the inductor wire when viewed from the third direction D3. When an angle at which a direction of the virtual vector is rotated when the start point is moved from a state where the start point of the virtual vector is disposed at one end of the virtual center line to the other end of the virtual center line is "360°", the number of turns is determined as "1.0 turns". Therefore, for example, when winding is performed by "180°", the number of turns becomes "0.5 turns".

In the first embodiment, the second magnetic layer 26 may not be a sintered body of ferrite as long as a plurality of steady regions exist in the DC superposition characteristic curve of the inductor 300 of the inductor component 10. For example, the second magnetic layer 26 may include a resin containing ferrite. The second magnetic layer 26 may be a magnetic layer containing metal magnetic powder other than iron or an iron alloy.

The composition of the first magnetic layer and the composition of the second magnetic layer may be substantially the same. In this case, the shape of the DC superposition characteristic curve of the inductor can be also adjusted by adjusting at least one of the items (A1) to (A5) or (A7).

In the second embodiment, the second magnetic layers 721 and 722 may contain a magnetic material other than ferrite as long as a plurality of steady regions exist in the DC superposition characteristic curve of the inductor 300 of the inductor component 10A. For example, the second magnetic layers 721 and 722 may contain a metal other than iron or an iron alloy as magnetic powder.

In the first and third embodiments, when there are a plurality of steady regions in the DC superposition characteristic curve of the inductor of the inductor component, the thickness T1 of the first magnetic layers 25 and 25B having low relative magnetic permeability may not be larger than the thickness T2 of the second magnetic layers 26 and 26B having high relative magnetic permeability. For example, the thickness T1 of the first magnetic layers 25 and 25B may be substantially equal to the thickness T2 of the second magnetic layers 26 and 26B, or the thickness T1 of the first magnetic layers 25 and 25B may be smaller than the thickness T2 of the second magnetic layers 26 and 26B.

In the first and third embodiments, when there are a plurality of steady regions in the DC superposition characteristic curve of the inductor of the inductor component, a discrepancy between the relative magnetic permeability of the first magnetic layers 25 and 25B and the relative magnetic permeability of the second magnetic layers 26 and 26B may be less than "ten times".

In the first and third embodiments, when there are a plurality of steady regions in the DC superposition characteristic curve of the inductor of the inductor component, the specified portions 20 and 20B may not have the magnetic layer having a relative magnetic permeability of "400" or more.

In the first and third embodiments, when there are a plurality of steady regions in the DC superposition characteristic curve of the inductor of the inductor component, the relative magnetic permeability of all the magnetic layers constituting the specified portions 20 and 20B may be "400" or more.

In the first and third embodiments, when there are a plurality of steady regions in the DC superposition characteristic curve of the inductor of the inductor component, the average particle diameter of the iron-based metal magnetic powder contained in the first magnetic layers 25 and 25B may be "1 (μm)" or less, or may be "10 (μm)" or more.

In the first and third embodiments, the filling rate of the iron-based metal magnetic powder in the first magnetic layers 25 and 25B may be less than "50 (wt %)" or may be "90 (wt %)" or more as long as there are a plurality of steady regions in the DC superposition characteristic curve of the inductor of the inductor component.

In the first and third embodiments, the second magnetic layers 26 and 26B may also contain iron-based metal magnetic powder as long as a plurality of steady regions exist in the DC superposition characteristic curve of the inductor of the inductor component.

In the first and third embodiments, when there are a plurality of steady regions in the DC superposition characteristic curve of the inductor of the inductor component, the first magnetic layers 25 and 25B may be magnetic layers not containing iron-based metal magnetic powder, and the second magnetic layers 26 and 26B may be magnetic layers containing iron-based metal magnetic powder.

In the embodiments, in the inductor component, the width WS2 of the interval on the horizontal axis of the second steady region RS2 may not be smaller than the width WS1 of the interval on the horizontal axis of the first steady region RS1. For example, the width WS2 of the interval on the horizontal axis of the second steady region RS2 may be equal to the width WS1 of the interval of the first steady region RS1 on the horizontal axis. Further, for example, the width WS2 of the interval on the horizontal axis of the second steady region RS2 may be larger than the width WS1 of the interval on the horizontal axis of the first steady region RS1. When the width WS2 of the interval on the horizontal axis of the second steady region RS2 is larger than the width WS1 of the interval on the horizontal axis of the first steady region RS1, the width WT of the interval on the horizontal axis of the transition region RT interposed between the first steady region RS1 and the second steady region RS2 may be made smaller than the width WS2 of the interval on the horizontal axis of the second steady region RS2. More preferably, the width WT of the interval on the horizontal axis of the transition region RT is set to "⅓" or less of the width WS2 of the interval on the horizontal axis of the second steady region RS2.

In the embodiments, the width WS2 of the interval on the horizontal axis of the second steady region RS2 may be "0.5 A" or more. In this case, the width WS1 of the interval on the horizontal axis of the first steady region RS1 may be "0.3 A" or more and less than "0.5 A" (i.e., from "0.3 A" to less than "0.5 A").

In the embodiments, the first steady region RS1 may be a region not including "0 A" on the horizontal axis. In the embodiments, the body of the inductor component may not include the surface layer 11.

In the third embodiment, the inductor component may include three or more inductors. In the third embodiment, the inductor component may have a configuration in which a plurality of inductor wires are arranged in the third direction D3.

The DC-DC converter equipped with the inductor component 10 may have a configuration different from a configuration of the DC-DC converter 70 described in the first embodiment. The multiphase DC-DC converter equipped with the inductor component 10B may have a configuration different from a configuration of the DC-DC converter 70B described in the third embodiment.

The inductor component may be equipped in an electronic device other than the DC-DC converter. The inductor component may be manufactured by another manufacturing method that does not use a semi-additive method. For example, the inductor component may be manufactured by a sheet laminating method, a print laminating method, or the like. The inductor wires may be formed by a thin film method such as sputtering or vapor deposition, a thick film method such as printing or coating, or a plating method such as full additive or subtractive.

What is claimed is:

1. An inductor component comprising:
   a body containing metal magnetic powder containing an iron element; and
   an inductor in the body and having both ends exposed from the body,
   in a DC superposition characteristic curve represented as a value for a DC bias current superimposed on an alternating current of 100 MHz flowing through the inductor, when a horizontal axis represents a value of the DC bias current, and a vertical axis represents a relative value of an inductance in a case where a value of the inductance generated when the value of the DC bias current is 0 A is set to 1,
   a steady region is defined as a region in which a fluctuation on the vertical axis is within 0.1 over an interval width of 0.3 A or more on the horizontal axis,
   a transition region is defined as a region in which a fluctuation on the vertical axis exceeds 0.1 in an interval width of less than 0.3 A on the horizontal axis, and
   in the DC superposition characteristic curve, a first steady region and a second steady region are present as the steady region, and the transition region is present between the first steady region and the second steady region.

2. The inductor component according to claim 1, wherein the first steady region is a region including 0 A on the horizontal axis.

3. The inductor component according to claim 2, wherein the interval width on the horizontal axis of the first steady region is longer than the interval width on the horizontal axis of the second steady region.

4. The inductor component according to claim 1, wherein an interval width on the horizontal axis of at least one of the first steady region or the second steady region is 0.5 A or more.

5. The inductor component according to claim 1, wherein the interval width on the horizontal axis of the first steady region is longer than the interval width on the horizontal axis of the second steady region.

6. The inductor component according to claim 5, wherein an interval width on the horizontal axis of the transition region is ⅓ or less of the interval width on the horizontal axis of the first steady region.

7. The inductor component according to claim 1, further comprising:
   a second inductor in the body and not electrically connected to a first inductor when the inductor is the first inductor.

8. A DC-DC converter comprising:

the inductor component according to claim 7;

an input terminal electrically connected to a DC power supply;

a first switching element on a wire electrically connecting the input terminal and the first inductor;

a second switching element on a wire electrically connecting the input terminal and the second inductor; and a controller configured to shift a phase by 360°/N between on and off of the first switching element and on and off of the second switching element, where N is a natural number of 2 or more.

9. A DC-DC converter comprising the inductor component according to claim 1.

10. The inductor component according to claim 1, wherein the body includes a first magnetic portion containing a first magnetic material and a second magnetic portion containing a second magnetic material different from the first magnetic material, and the first magnetic material contains the metal magnetic powder containing the iron element.

11. The inductor component according to claim 10, wherein the metal magnetic powder containing the iron element has an average particle diameter of from 1 μm to 10 μm, and the first magnetic portion includes a resin containing from 50 wt % to 90 wt % of the metal magnetic powder containing the iron element.

12. The inductor component according to claim 10, wherein the second magnetic portion is a sintered body obtained by sintering a magnetic material.

13. The inductor component according to claim 10, wherein the first magnetic portion and the second magnetic portion are laminated.

14. The inductor component according to claim 13, wherein the body has a portion in which a plurality of layers including the first magnetic portion and the second magnetic portion are laminated, the inductor includes an inductor wire extending along a main surface of one of the plurality of layers in the body, the first magnetic portion is in contact with the inductor wire, and the inductor wire is sandwiched between the first magnetic portion and the second magnetic portion in a laminating direction of the plurality of layers.

15. The inductor component according to claim 14, wherein the body includes a third magnetic portion as the layer, and the third magnetic portion contains a third magnetic material different from the first magnetic material contained in the first magnetic portion and the second magnetic material contained in the second magnetic portion.

16. The inductor component according to claim 14, wherein at least one of the plurality of layers has a relative magnetic permeability of 400 or more.

17. The inductor component according to claim 14, wherein at least one of the plurality of layers has a relative magnetic permeability of from 1 to 2.

18. The inductor component according to claim 14, wherein the plurality of layers includes a plurality of layers having relative magnetic permeability different from each other by ten times or more.

19. The inductor component according to claim 14, wherein the plurality of layers include two layers having relative magnetic permeability different from each other, and of the two layers, the layer having lower relative magnetic permeability is thicker than the layer having higher relative magnetic permeability.

\* \* \* \* \*